(12) United States Patent
Shen et al.

(10) Patent No.: US 11,265,102 B2
(45) Date of Patent: Mar. 1, 2022

(54) DOWNLINK CONTROL CHANNEL DETECTION METHOD, DOWNLINK CONTROL CHANNEL TRANSMISSION METHOD, NETWORK SIDE DEVICE AND USER EQUIPMENT

(71) Applicant: VIVO MOBILE COMMUNICATION CO., LTD., Dongguan (CN)

(72) Inventors: Xiaodong Shen, Dongguan (CN); Lei Jiang, Dongguan (CN); Fei Qin, Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 280 days.

(21) Appl. No.: 16/346,865

(22) PCT Filed: Oct. 31, 2017

(86) PCT No.: PCT/CN2017/108616
§ 371 (c)(1),
(2) Date: May 1, 2019

(87) PCT Pub. No.: WO2018/082546
PCT Pub. Date: May 11, 2018

(65) Prior Publication Data
US 2019/0280807 A1    Sep. 12, 2019

(30) Foreign Application Priority Data
Nov. 4, 2016  (CN) .......................... 201610966566.9

(51) Int. Cl.
*H04L 1/00*    (2006.01)
*H04L 1/18*    (2006.01)
(Continued)

(52) U.S. Cl.
CPC .............. *H04L 1/0038* (2013.01); *H04L 1/00* (2013.01); *H04L 1/0005* (2013.01);
(Continued)

(58) Field of Classification Search
None
See application file for complete search history.

(56) References Cited

U.S. PATENT DOCUMENTS

2012/0250641 A1   10/2012   Sartori et al.
2012/0257552 A1   10/2012   Chen et al.
(Continued)

FOREIGN PATENT DOCUMENTS

CN    101115052 A    1/2008
CN    101692739 A    4/2010
(Continued)

OTHER PUBLICATIONS

1st Chinese Office Action for Chinese Application No. 201610966566. 9, dated May 21, 2019 (dated May 21, 2019)—11 pages English translation—13 pages).
(Continued)

*Primary Examiner* — James P Duffy
(74) *Attorney, Agent, or Firm* — Culhane Meadows PLLC; Stephen J. Weed

(57) ABSTRACT

The present disclosure provides a downlink control channel detection method, a downlink control channel transmission method, a network side device and a User Equipment (UE). The downlink control channel detection method includes: determining a detection mode for a downlink control channel; and detecting the downlink control channel in accordance with the determined detection mode for the downlink control channel. The detection mode for the downlink control channel includes a one-stage detection mode in which control information for the detection of a data channel is
(Continued)

acquired through a single downlink control channel detection operation and a multiple-stage detection mode in which the control information for the detection of the data channel is acquired through at least two downlink control channel detection operations.

20 Claims, 10 Drawing Sheets

(51) Int. Cl.
    *H04W 48/12* (2009.01)
    *H04W 72/04* (2009.01)
    *H04W 76/27* (2018.01)
    *H04W 80/02* (2009.01)
    *H04W 72/12* (2009.01)
    *H04L 5/00* (2006.01)

(52) U.S. Cl.
    CPC .......... *H04L 1/1819* (2013.01); *H04L 5/0053* (2013.01); *H04L 5/0094* (2013.01); *H04W 48/12* (2013.01); *H04W 72/04* (2013.01); *H04W 72/042* (2013.01); *H04W 72/12* (2013.01); *H04W 76/27* (2018.02); *H04W 80/02* (2013.01)

(56) References Cited

U.S. PATENT DOCUMENTS

| | | |
|---|---|---|
| 2015/0023265 A1 | 1/2015 | Park et al. |
| 2015/0264708 A1 | 9/2015 | Li et al. |
| 2019/0045532 A1 | 2/2019 | Zhu et al. |

FOREIGN PATENT DOCUMENTS

| | | |
|---|---|---|
| CN | 102448053 A | 5/2012 |
| CN | 102858014 A | 1/2013 |
| CN | 103563284 A | 2/2014 |
| CN | 103796327 A | 5/2014 |
| CN | 104137440 A | 11/2014 |
| CN | 104144513 A | 11/2014 |
| CN | 105722239 A | 6/2016 |
| WO | 2010091608 A1 | 8/2010 |

OTHER PUBLICATIONS

Extended European Search Report for European Application No. 17866685.5, dated Oct. 22, 2019 (dated Oct. 22, 2019)—7 pages.
International Search Report and Written Opinion for International Application No. PCT/CN2017/108616, dated May 16, 2019 (dated May 16, 2019)—11 pages (English translation—6 pages).

DOWNLINK CONTROL CHANNEL DETECTION METHOD, DOWNLINK CONTROL CHANNEL TRANSMISSION METHOD, NETWORK SIDE DEVICE AND USER EQUIPMENT

CROSS-REFERENCE TO RELATED APPLICATION

The present application is the U.S. national phase of PCT Application No. PCT/CN2017/108616 filed on Oct. 31, 2017, which claims the priority of the Chinese patent application 201610966566.9 filed on Nov. 4, 2016, which are incorporated herein by reference in their entirety.

TECHNICAL FIELD

The present disclosure relates to the field of mobile communication technology, in particular to a downlink control channel detection method, a downlink control channel transmission method, a network side device and a User Equipment (UE).

BACKGROUND

In a mobile communication system, usually a UE needs to detect a control channel, to acquire such information as a time-frequency resource position of a data channel, a modulation and coding scheme, and a Hybrid Automatic Repeat reQuest (HARQ) process, thereby to facilitate the subsequent data demodulation and decoding.

The UE may detect a downlink control channel in a one-stage detection mode. The so-called "one-stage detection" refers to that the UE may acquire control information for the detection of the data channel merely through a single detection operation on the downlink control channel, so as to acquire such information as the time-frequency resource position of the data channel, the modulation and coding scheme, and the HARQ process, thereby to demodulate and decode data from network. In other words, once the UE has detected, in a certain downlink control channel, the control information for the data channel detection from the network, the UE may not detect the downlink control channel any longer, and instead, it may receive the data channel to acquire the data from the network. In this regard, it is able to provide relatively high detection efficiency through the one-stage detection, i.e., the UE may acquire the control information for the data channel detection through a single detection operation. However, at this time, the detection performed by the UE is highly demanded, i.e., the UE needs to perform the detection on each active transmission resource (e.g., subframe) to determine whether there is a control channel belonging to the UE itself.

In addition, the control channel may also be detected in a multiple-stage detection mode, and usually the detection complexity in the multiple-stage detection is relatively high.

SUMMARY

(1) Technical Problem to be Solved

An object of the present disclosure is to provide a downlink control channel detection method, a downlink control channel transmission method, a network side device and a UE, so as to strike a balance between the reduction in the power consumption for the UE and the reduction in the detection complexity.

(2) Technical Solutions

In one aspect, the present disclosure provides in some embodiments a downlink control channel detection method, including: determining a detection mode for a downlink control channel; and detecting the downlink control channel in accordance with the determined detection mode for the downlink control channel. The detection mode for the downlink control channel includes a one-stage detection mode in which control information for the detection of a data channel is acquired through a single downlink control channel detection operation and a multiple-stage detection mode in which the control information for the detection of the data channel is acquired through at least two downlink control channel detection operations.

In another aspect, the present disclosure provides in some embodiments a downlink control channel transmission method, including: selecting a transmission mode for a downlink control channel; and transmitting the downlink control channel in accordance with the selected transmission mode for the downlink control channel. The transmission mode includes a one-stage transmission mode in which control information for the detection of a data channel is provided through the transmission of the downlink control channel for one time and a multiple-stage transmission mode in which the control information for the detection of the data channel is provided through the transmission of the downlink control channel for several times.

In yet another aspect, the present disclosure provides in some embodiments a UE, including: a determination module configured to determine a detection mode for a downlink control channel; and a detection module configured to detect the downlink control channel in accordance with the determined detection mode for the downlink control channel. The detection mode for the downlink control channel includes a one-stage detection mode in which control information for the detection of a data channel is acquired through a single downlink control channel detection operation and a multiple-stage detection mode in which the control information for the detection of the data channel is acquired through at least two downlink control channel detection operations.

In still yet another aspect, the present disclosure provides in some embodiments a network side device, including: a selection module configured to select a transmission mode for a downlink control channel; and a first transmission module configured to transmit the downlink control channel in accordance with the selected transmission mode for the downlink control channel. The transmission mode includes a one-stage transmission mode in which control information for the detection of a data channel is provided through the transmission of the downlink control channel for one time and a multiple-stage transmission mode in which the control information for the detection of the data channel is provided through the transmission of the downlink control channel for several times.

In still yet another aspect, the present disclosure provides in some embodiments a UE, including a processor, a memory, and a computer program stored in the memory and executed by the processor. The processor is configured to execute the computer program so as to implement the above-mentioned downlink control channel detection method.

In still yet another aspect, the present disclosure provides in some embodiments a network side device, including a processor, a memory, and a computer program stored in the memory and executed by the processor. The processor is configured to execute the computer program so as to implement the above-mentioned downlink control channel transmission method.

In still yet another aspect, the present disclosure provides in some embodiments a computer-readable storage medium storing therein a computer program. The computer program is executed by a processor so as to implement the above-mentioned downlink control channel detection method.

In still yet another aspect, the present disclosure provides in some embodiments a computer-readable storage medium storing therein a computer program. The computer program is executed by a processor so as to implement the above-mentioned downlink control channel transmission method.

(3) Beneficial Effects

According to the downlink control channel detection method, the downlink control channel transmission method, the network side device and the UE in the embodiments of the present disclosure, as compared with the related art, it is able to support various detection modes for the downlink control channel. Through the one-stage detection mode and the multiple-stage detection mode for the downlink control channel, the UE may detect the downlink control channel in accordance with the detection mode indicated by the network side device, so as to adaptively adjust the detection mode for the downlink control channel, thereby to strike a balance between the reduction in the power consumption for the UE and the reduction in the detection complexity. In addition, the network side device may indicate the detection mode for the downlink control channel to the UE through high-layer control signaling, so as to reduce the detection complexity of a first downlink control channel. Moreover, the network side device may transmit control signaling hierarchical information through the first downlink control channel to the UE, so as to indicate the detection mode for the downlink control channel, thereby to reduce the overhead for the high-layer signaling.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

Figure 1:
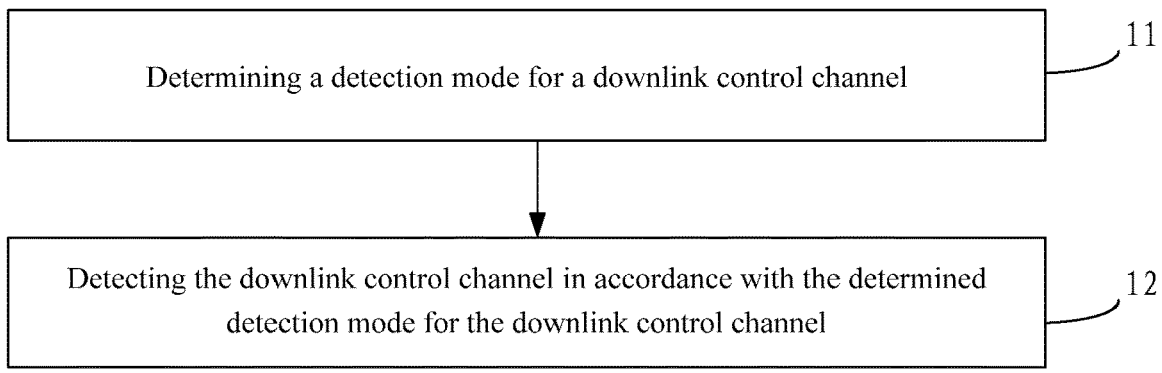
FIG. 1 is a flow chart of a downlink control channel detection method according to a first embodiment of the present disclosure.

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

First Embodiment

In this embodiment, a UE may support various detection modes for a downlink control channel, including a one-stage detection mode and a multiple-stage detection mode. The multiple-stage detection mode may include a two-stage detection mode or a more-than-two-stage detection mode.

Here, the one-stage detection mode is commonly used by the UE for the downlink control channel in the related art, and it refers to a mode in which control information for the detection of a data channel is acquired through merely a single downlink control channel detection operation. Illustratively but not restrictively, the UE may acquire such information as a time-frequency resource position of the data channel, a modulation and coding scheme, and an HARQ process, so as to demodulate and decode data from a network. In other words, once the UE has detected the control information for the detection of the data channel from the network in a certain downlink control channel, the UE may not detect the downlink control channel any longer, and instead, it may receive the data channel and acquire the data from the network. Of course, more information, e.g., uplink control information for uplink transmission, may also be acquired through the downlink control channel detection.

The multiple-stage detection mode refers to a mode in which the control information for the detection of the data channel is acquired through at least two downlink control channel detection operations. When the quantity of detection operations is less than the predetermined quantity of detection operations for the multiple-stage detection mode, it is impossible to acquire sufficient information for the detection of the data channel. The quantity of detection operations for the multiple-stage detection mode may be 2, 3 or more, and preferably 2. The implementation of the multiple-stage detection mode for the downlink control channel will be described at the end of the specification by taking a two-stage detection mode as an example.

Based on the above, it is able to improve the detection efficiency through the one-stage detection mode, i.e., the UE may acquire the control information for the corresponding data channel through one detection operation. However, at this time, the detection performed by the UE is highly demanded, i.e., the UE needs to perform the detection on each active transmission resource (e.g., subframe) so as to determine whether there is a control channel belonging to the UE itself, resulting in relatively large power consumption for the UE. Through the multiple-stage detection mode, it is able to reduce the detection frequency to some extent, thereby to reduce the power consumption. However, the detection complexity is relatively high through the multiple-stage detection.

An object of the present disclosure is to provide a transmission/reception scheme for the downlink control channel, so as to support various detection modes for the downlink control channel and adaptively adjust the detection mode, thereby to strike a balance between the reduction in the power consumption for the UE and the reduction in the detection complexity.

As shown in FIG. 1, the present disclosure provides in this embodiment a downlink control channel detection method for use in a UE, which includes the following steps.

Step 11: determining a detection mode for a downlink control channel.

Here, the UE needs to determine the detection mode for the downlink control channel. The detection mode for the downlink control channel may include a one-stage detection mode in which control information for the detection of a data channel is acquired through a single downlink control channel detection operation and a multiple-stage detection mode in which the control information for the detection of the data channel is acquired through at least two downlink control channel detection operations.

Step 12: detecting the downlink control channel in accordance with the determined detection mode for the downlink control channel.

In this embodiment, when the determined detection mode for the downlink control channel is the one-stage detection mode, the control information for the detection of the downlink channel may be acquired from a first downlink control channel. For example, information carried in the downlink control channel in the one-stage detection mode may be marked as Downlink Control Indication (DCI). Illustratively but not restrictively, the DCI may include such information as a time-frequency resource of the data channel, a modulation and coding scheme, and an HARQ process. Table 1 shows a format of the DCI, for example.

TABLE 1

| Time-frequency resource of data channel | modulation and coding scheme | HARQ process | ... | ... | ... |
| --- | --- | --- | --- | --- | --- |

In this embodiment, when the determined detection mode for the downlink control channel is the multiple-stage detection mode, the UE may read control information for the detection of a next-stage downlink control channel from the first downlink control channel, and detect the downlink control channels stage by stage in accordance with the control information for the detection of the downlink control channel, until the control information for the detection of the data channel has been acquired.

For example, the UE may read the control information for the detection of a next-stage downlink control channel from the first downlink control channel, and detect a next-stage control channel (e.g., a second control channel) in accordance with the acquired control information for the detection of the next-stage downlink control channel, so as to acquire the control information for the detection of the data channel on the second control channel (when the multiple-stage detection mode is the two-stage detection mode). Alternatively, the UE may further acquire control information for the detection of a next-stage control channel (e.g., a third control channel) of the second control channel, and detect the downlink control channels stage by stage, until the control information for the detection of the data channel has been acquired.

Here, the control information for the detection of the downlink control channel may include at least one of a time-domain position of the downlink control channel, a frequency-domain position of the downlink control channel, a space-domain position of the downlink control channel, and indices of subcarriers where the downlink control channel is located. Based on the above information, the UE may determine the time-frequency position of the downlink control channel, and detect the downlink control channel at a corresponding position.

The control information for the detection of the data channel may include at least one of a resource position of the data channel, a modulation and coding scheme adopted by the data channel, and an HARQ process information corresponding to the data channel. Based on the above information, the UE may determine a time-frequency position of the data channel, and detect the data channel at a corresponding position.

Through the above steps, the UE in this embodiment may perform one-stage detection or multiple-stage detection in accordance with the determined detection mode for the downlink control channel. As a result, it is able for the UE to support various detection modes for the downlink control channel, and adaptively adjust the detection mode, thereby to strike a balance between the reduction in the power consumption for the UE and the reduction in the detection complexity.

Second Embodiment

Figure 2:
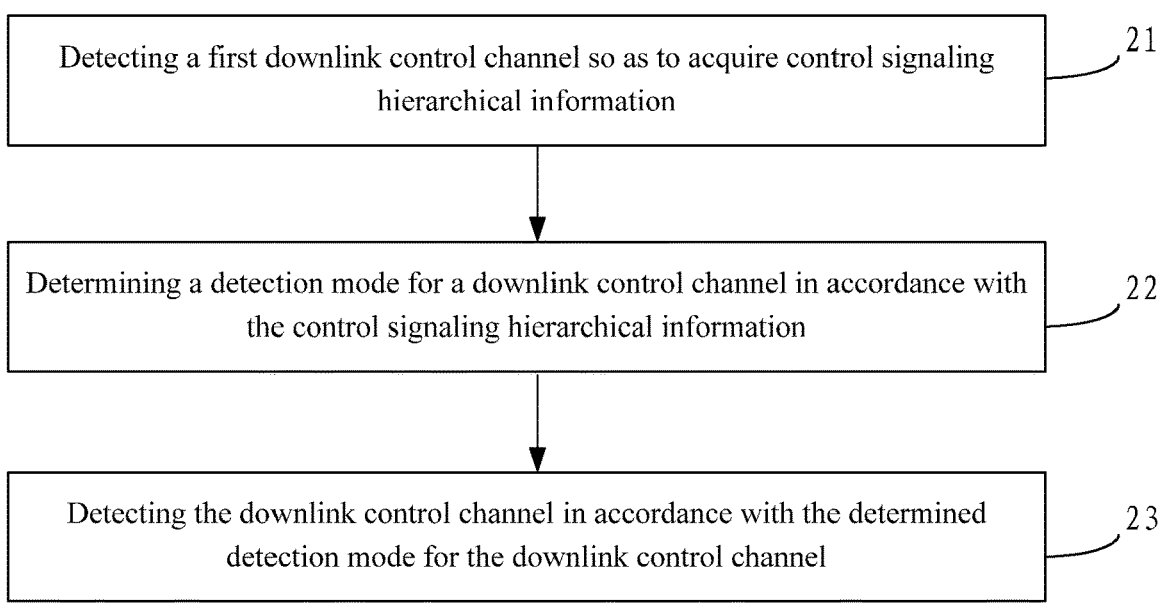
FIG. 2 is a flow chart of a downlink control channel detection method according to a second embodiment of the present disclosure.

As shown in FIG. 2, the present disclosure provides in this embodiment a downlink control channel detection method for use in a UE, which includes the following steps.

Step 21: detecting a first downlink control channel so as to acquire control signaling hierarchical information.

Here, the control signaling hierarchical information is used for indicating a detection mode for a downlink control channel. The detection mode for the downlink control channel may include a one-stage detection mode in which control information for the detection of a data channel is acquired merely through a single downlink control channel detection operation and a multiple-stage detection mode in which the control information for the detection of the data channel is acquired through at least two downlink control channel detection operations.

Step 22: determining the detection mode for the downlink control channel in accordance with the control signaling hierarchical information.

For example, in this embodiment, the control signaling hierarchical information, e.g., 1-bit control signaling hierarchical information, may be transmitted through the first downlink control channel. When the control signaling hierarchical information is 0, it means that the first downlink control channel is a control channel which is to be detected in the one-stage detection mode, and when the control signaling hierarchical information is 1, it means that the first downlink control channel is a first-stage control channel which is to be detected in the multiple-stage detection mode. In other words, when the control signaling hierarchical information is 0, the detection mode may be the one-stage detection mode, and otherwise, the detection mode may be the multiple-stage detection mode. Of course, a correspondence between values of the control signaling hierarchical information and the detection modes will not be particularly defined herein.

Step 23: detecting the downlink control channel in accordance with the determined detection mode for the downlink control channel.

To be specific, in Step 21, the UE may detect the first downlink control channel in a blind detection manner, and then read the control signaling hierarchical information from the first downlink control channel. Alternatively, the UE may determine a resource position of the first downlink control channel in accordance with physical layer signaling or high-layer control signaling acquired in advance, detect the first downlink control channel, and read the control signaling hierarchical information from the first downlink control channel.

When the detection mode for the downlink control channel determined in Step 22 is the one-stage detection mode, in Step 23, the UE may continue to read the control information for the detection of the data channel from the first downlink control channel. When the detection mode for the downlink control channel determined in Step 22 is the multiple-stage detection mode, in Step 23, the UE may read the control information for the detection of the next-stage downlink control channel from the first downlink control channel, and detect the downlink control channels stage by stage in accordance with the control information for the detection of the downlink control channel, until the control information for the detection of the data channel has been acquired.

For example, information carried in the first downlink control channel may be marked as DCI_1. Illustratively but not restrictively, DCI_1 may include the information as shown in Table 2.

TABLE 2

| Control signaling hierarchical information (1-bit) | Other fields |
|---|---|

For example, when the control signaling hierarchical information (1-bit) has a value of 0, it means that the detection mode is the multiple-stage detection mode. At this time, the other fields in Table 2 may be adopted to indicate the control information for the detection of a next-stage control channel of the first downlink control channel. Table 3 shows an example of DCI_1. In Table 3, CONTROL2 represents the next-stage control channel of the first downlink control channel.

TABLE 3

| | Other fields | | | |
|---|---|---|---|---|
| Control signaling hierarchical information (1-bit) = 0 | Number of subframe position where CONTROL2 probably occurs in a time domain | Position where CONTROL2 probably occurs in a frequency domain | Position where CONTROL2 probably occurs in a space domain | Number of subcarrier position where CONTROL2 probably occurs in the time domain |

The information carried in the other fields may be contained in an index table in a certain combination mode, and an index value may be provided so as to achieve a same technical effect, as shown in Table 4.

TABLE 4

| Index | Subframe position | Frequency-domain position | Space-domain position | Subcarrier position |
|---|---|---|---|---|
| 001 | xx | yy | zz | ww |
| 002 | | | | |
| ... | | | | |
| 016 | | | | |

For example, when the control signaling hierarchical information (1-bit) has a value of 1, it means that the detection mode is the one-stage detection mode. At this time, the other fields in Table 2 may be adopted to indicate the control information for the detection of the data channel, as shown in Table 5.

TABLE 5

| | Other fields | | | | |
|---|---|---|---|---|---|
| Time-frequency resource of data channel | Modulation and coding scheme | HARQ process | ... | ... | ... |

(1-bit) = 1 Control signaling hierarchical information (1-bit) = 1

In this embodiment, the control information for the detection of the downlink control channel may include at least one of a time-domain position of the downlink control channel, a frequency-domain position of the downlink control channel, a space-domain position of the downlink control channel, and indices of subcarriers where the downlink control channel is located. The control information for the detection of the data channel may include at least one of a resource position of the data channel, a modulation and coding scheme adopted by the data channel, and an HARQ process information corresponding to the data channel.

In this embodiment, the detection mode may be directly indicated in the first downlink control channel. The UE may acquire the control signaling hierarchical information indicating the detection mode for the downlink control channel from the first downlink control channel, so as to determine the detection mode. As a result, through the indication of the detection mode directly in the first downlink control channel, it is able to reduce the high-layer signaling overhead.

Third Embodiment

Figure 3:
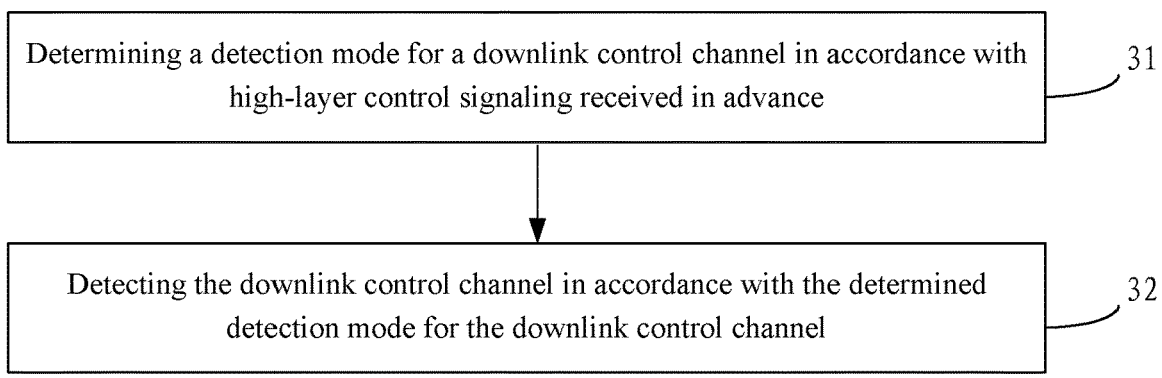
FIG. 3 is a flow chart of a downlink control channel detection method according to a third embodiment of the present disclosure.

As shown in FIG. 3, the present disclosure provides in this embodiment a downlink control channel detection method for use in a UE, which includes the following steps.

Step 31: determining a detection mode for a downlink control channel in accordance with high-layer control signaling received in advance.

Here, the high-layer control signaling may include Radio Resource Control (RRC) signaling or a Media Access Control (MAC) message. A network side device, e.g., a base station, may indicate the detection mode for the downlink control channel to the UE through the high-layer control signaling in advance. For example, an MAC message entity may be added in a communication system, and this message entity may include 1-bit information. The network side device may transmit a message about the MAC message entity to the UE, so as to enable or disable a function corresponding to a multiple-stage detection mode. When it is necessary to enable the function corresponding to the multiple-stage detection mode in accordance with the message, the UE may determine that the detection mode for the downlink control channel is the multiple-stage detection mode, and otherwise, it may determine that the detection mode for the downlink control channel is a one-stage detection mode. For another example, the RRC signaling may be added at an RRC layer, and this signaling may include 1-bit indicator, so as to enable or disable the function corresponding to the multiple-stage detection mode. When it is necessary to enable the function corresponding to the multiple-stage detection mode in accordance with the RRC signaling, the UE may determine that the detection mode for the downlink control channel is the multiple-stage detection mode, and otherwise, it may determine that the detection mode is the one-stage detection mode.

Step 32: detecting the downlink control channel in accordance with the determined detection mode for the downlink control channel.

In this embodiment, when the determined detection mode for the downlink control channel is the one-stage detection mode, the UE may detect a first downlink control channel in a blind detection manner or in accordance with physical layer signaling or high-layer control signaling acquired in advance, and read control information for the detection of a data channel from the detected first downlink control channel. Also, a network may indicate a position of the first downlink control channel to the UE in advance through the high-layer signaling or high-layer control signaling, and then the UE may detect the first downlink control channel in accordance with the physical layer signaling or high-layer control signaling. After the first downlink control channel has been detected, the UE may read the control information for the detection of the data channel from the first downlink control channel.

In this embodiment, when the determined detection mode for the downlink control channel is the multiple-stage detection mode, the UE may detect the first downlink control channel in a blind detection manner or in accordance with the physical layer signaling or high-layer control signaling acquired in advance, read control information for the detection of a next-stage downlink control channel from the first downlink control channel, and detect the downlink control channels stage by stage in accordance with the control information for the detection of the downlink control channel, until the control information for the detection of the data channel has been acquired. In other words, the UE may detect the downlink control channels stage by stage in accordance with the control information for the detection of the next-stage downlink control channel from a current-stage downlink control channel, until the control information for the detection of the data channel has been acquired.

In this embodiment, the control information for the detection of the downlink control channel may include at least one of a time-domain position of the downlink control channel, a frequency-domain position of the downlink control channel, a space-domain position of the downlink control channel, and indices of subcarriers where the downlink control channel is located. The control information for the detection of the data channel may include at least one of a resource position of the data channel, a modulation and coding scheme adopted by the data channel, and an HARQ process information corresponding to the data channel.

According to the third embodiment of the present disclosure, the detection mode for the downlink control channel may be indicated to the UE through the high-layer control signaling, so as to reduce the detection complexity of the first downlink control channel at the UE. In addition, the UE may select the one-stage detection mode or the multiple-stage detection mode for the downlink control channel in accordance with the practical need, so it is able to strike a balance between the reduction in the power consumption and the reduction in the detection complexity.

Fourth Embodiment

Figure 4:
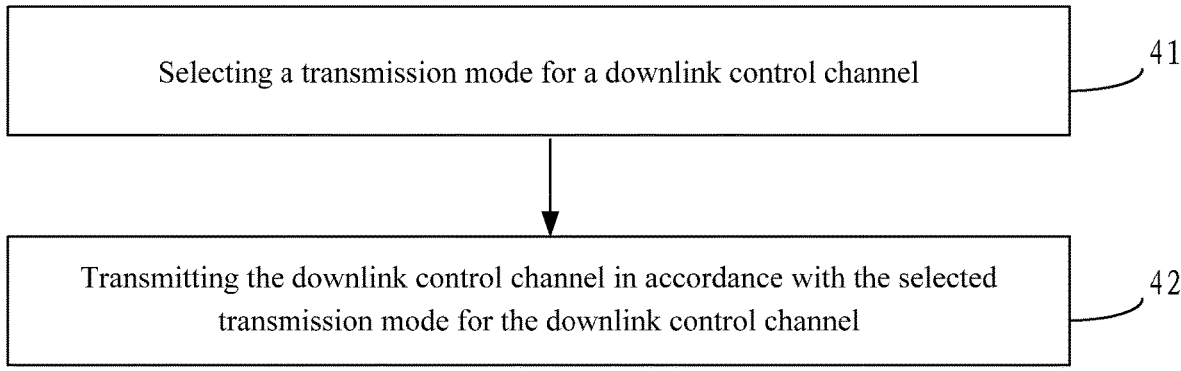
FIG. 4 is a flow chart of a downlink control channel transmission method according to a fourth embodiment of the present disclosure.

As shown in FIG. 4, the present disclosure provides in this embodiment a downlink control channel transmission method for use in a network side device, e.g., a base station, which includes the following steps.

Step 41: selecting a transmission mode for a downlink control channel.

Here, the transmission mode for the downlink control channel may include a one-stage transmission mode in which control information for the detection of a data channel is provided through the transmission of the downlink control channel for one time and a multiple-stage transmission mode in which the control information for the detection of the data channel is provided through the transmission of the downlink control channel for several times. In other words, in the one-stage transmission mode, the control information for the detection of the data channel may be provided merely through the transmission of the downlink control channel for one time, and in the multiple-stage transmission mode, the control information for the detection of the data channel may be provided through the transmission of the downlink control channel for several times. The network side device, e.g., the base station, may select the transmission mode, e.g., the one-stage transmission mode or the multiple-stage transmission mode, for a certain UE in accordance with the practical need.

Step 42: transmitting the downlink control channel in accordance with the selected transmission mode for the downlink control channel.

In this embodiment, when the selected transmission mode for the downlink control channel is the one-stage transmission mode, the control information for the detection of the data channel may be transmitted on a first downlink control channel. When the selected transmission mode for the downlink control channel is the multiple-stage transmission mode, control information for the detection of a next-stage downlink control channel may be transmitted on a current-stage downlink control channel other than a last-stage downlink control channel, and the control information for the detection of the data channel may be transmitted on the last-stage downlink control channel.

Here, the control information for the detection of the downlink control channel may include at least one of a time-domain position of the downlink control channel, a frequency-domain position of the downlink control channel, a space-domain position of the downlink control channel, and indices of subcarriers where the downlink control channel is located. The control information for the detection of the data channel may include at least one of a resource position of the data channel, a modulation and coding scheme adopted by the data channel, and an HARQ process information corresponding to the data channel.

Through the above steps, the base station may select the transmission mode for the downlink control channel, and transmit the control information for the detection of the downlink control channel to the UE in accordance with the transmission mode, so the base station may support various transmission modes for the downlink control channel. Correspondingly, it is able for the UE to support various detection modes, e.g., the one-stage detection mode and the multiple-stage detection mode as mentioned hereinabove, for the downlink control channel, and adaptively adjust the detection mode, thereby to strike a balance between the reduction in the power consumption for the UE and the reduction in the detection complexity.

Fifth Embodiment

Figure 5:
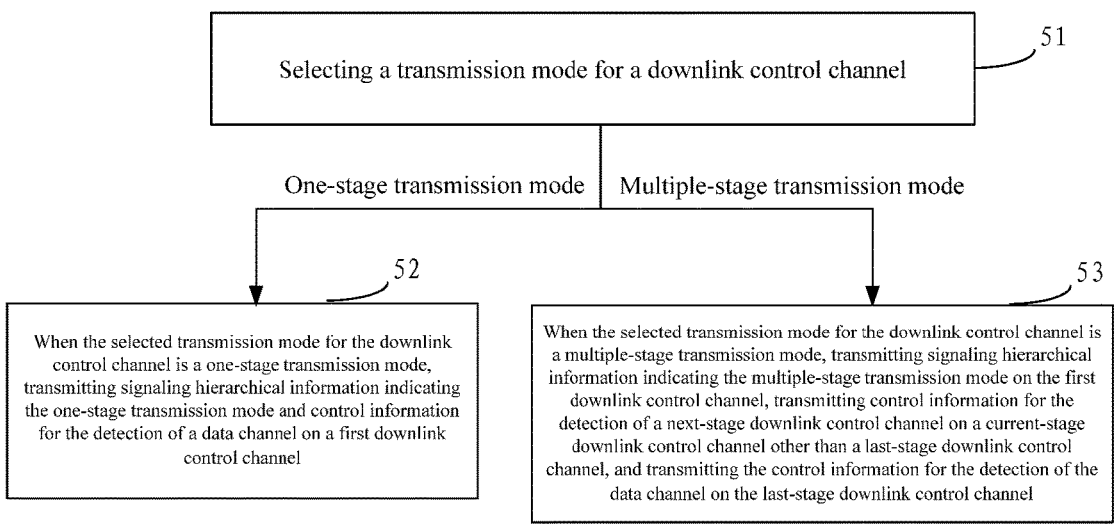
FIG. 5 is a flow chart of a downlink control channel transmission method according to a fifth embodiment of the present disclosure.

As shown in FIG. 5, the present disclosure provides in this embodiment a downlink control channel transmission method for use in a network side device, e.g., a base station, which includes the following steps.

Step 51: selecting a transmission mode for a downlink control channel, when a one-stage transmission mode is selected, proceeding to Step 52, and when a multiple-stage transmission mode is selected, proceeding to Step 53.

Here, the network side device, e.g., the base station, may select the transmission mode, the one-stage transmission mode or the multiple-stage transmission mode, for a certain UE in accordance with the practical need. The transmission mode may include a one-stage transmission mode in which control information for the detection of a data channel is provided through the transmission of the downlink control channel for one time and a multiple-stage transmission mode in which the control information for the detection of the data channel is provided through the transmission of the downlink control channel for several times.

Step 52: when the selected transmission mode for the downlink control channel is the one-stage transmission mode, transmitting signaling hierarchical information indicating the one-stage transmission mode and control information for the detection of a data channel on a first downlink control channel.

Step 53: when the selected transmission mode for the downlink control channel is the multiple-stage transmission mode, transmitting signaling hierarchical information indicating the multiple-stage transmission mode on the first downlink control channel, transmitting control information for the detection of a next-stage downlink control channel on a current-stage downlink control channel other than a last-stage downlink control channel, and transmitting the control information for the detection of the data channel on the last-stage downlink control channel.

Here, the control information for the detection of the downlink control channel may include at least one of a time-domain position of the downlink control channel, a frequency-domain position of the downlink control channel, a space-domain position of the downlink control channel, and indices of subcarriers where the downlink control channel is located. The control information for the detection of the data channel may include at least one of a resource position of the data channel, a modulation and coding scheme adopted by the data channel, and an HARQ process information corresponding to the data channel.

In this embodiment, the base station may also transmit physical layer signaling or high-layer control signaling for indicating a resource position of the first downlink control channel to the UE in advance, so as to reduce the detection complexity of the first downlink control channel at the UE. Of course, the base station may not transmit the physical layer signaling or high-layer control signaling, and instead, the UE may detect the first downlink control channel in a blind detection manner.

In this embodiment, when the selected transmission mode for the downlink control channel is the multiple-stage transmission mode, control messages transmitted on the downlink control channels may have different lengths. At this time, a zero-padding operation or a compression operation may be performed on the control message transmitted on the downlink control channel. Through the zero-padding operation or the compression operation, the control messages may have a same length, so as to reduce the detection complexity at the UE.

For example, with respect to the zero-padding operation, a maximum length of the control message transmitted on each downlink control channel may be determined, and then the zero-padding operation may be performed on the control message having a length smaller than the maximum length, so as to acquire the control message after the zero-padding operation. In this way, through the zero-padding operation, the control messages may have a same length.

For another example, with respect to the compression operation, a final length of the control message transmitted on each downlink control channel may be determined, and a predetermined field in each control message having a length greater than the final length may be discarded so as to acquire the control message after the compression operation, and then the discarded predetermined field may be transmitted to the UE through high-layer control signaling. To be specific, the final length may be a minimum length of the control message transmitted on each downlink control channel, and the high-layer control signaling may be RRC signaling or an MAC message.

According to the fifth embodiment of the present disclosure, the network side device may indicate the one-stage transmission mode or the multiple-stage transmission mode through the signaling hierarchical information carried on the first downlink control channel, so as to reduce the high-layer signaling overhead for the indication of the transmission mode. In addition, it is able for the network side device to control the UE to adjust the detection mode, e.g., the one-stage detection mode or the multiple-stage detection mode mentioned hereinabove, for the downlink control channel, and adaptively adjust the detection mode, thereby to strike a balance between the reduction in the power consumption for the UE and the reduction in the detection complexity.

Sixth Embodiment

Figure 6:
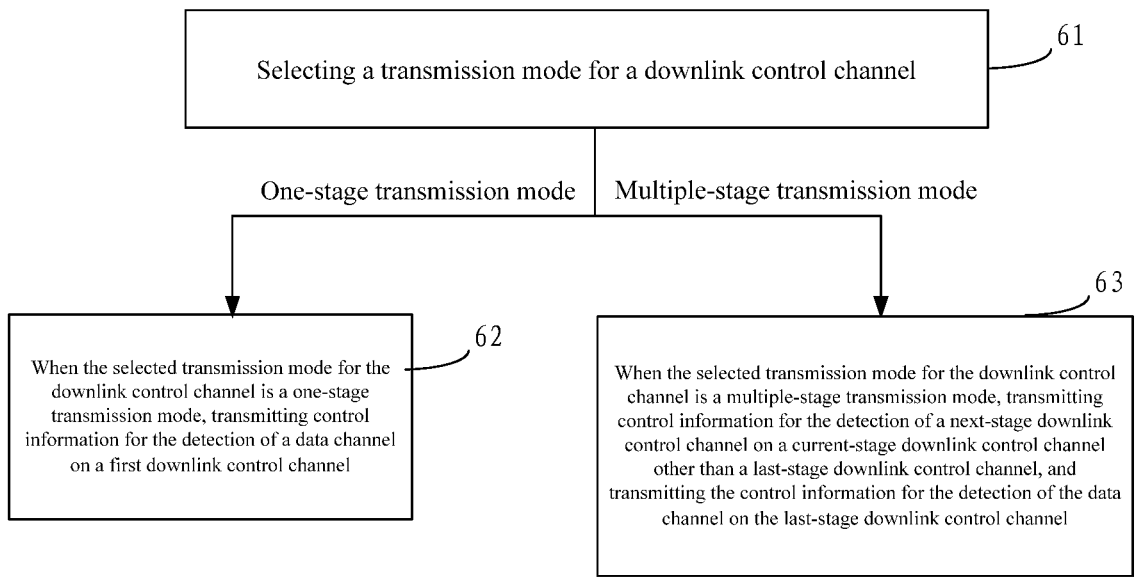
FIG. 6 is a flow chart of a downlink control channel transmission method according to a sixth embodiment of the present disclosure.

As shown in FIG. 6, the present disclosure provides in this embodiment a downlink control channel transmission method for use in a network side device, e.g., a base station, which includes the following steps.

Step 61: selecting a transmission mode for a downlink control channel, when a one-stage transmission mode is selected, proceeding to Step 62, and when a multiple-stage transmission mode is selected, proceeding to Step 63.

Here, the network side device, e.g., the base station, may select the transmission mode, e.g., the one-stage transmission mode or the multiple-stage transmission mode, for a certain UE in accordance with the practical need.

Step 62: when the selected transmission mode for the downlink control channel is the one-stage transmission mode, transmitting control information for the detection of a data channel on a first downlink control channel.

Step 63: when the selected transmission mode for the downlink control channel is the multiple-stage transmission mode, transmitting control information for the detection of a next-stage downlink control channel on a current-stage downlink control channel other than a last-stage downlink control channel, and transmitting the control information for the detection of the data channel on the last-stage downlink control channel.

In this embodiment, the base station may transmit the control information for the detection of the next-stage downlink control channel or the control information for the detection of the data channel on the current-stage downlink control channel, but not transmit the signaling hierarchical information on the first downlink control channel.

In addition, in order to enable the UE to determine a detection mode, e.g., a one-stage detection mode or a multiple-stage detection mode, for the downlink control channel, in this embodiment, the base station may transmit physical layer signaling or high-layer control signaling for indicating the detection mode to the UE in advance, and the detection modes for the downlink control channel may correspond to the transmission modes for the downlink control channel respectively. In this way, the UE may determine the detection mode for the downlink control channel in accordance with the physical layer signaling or high-layer control signaling.

Here, the control information for the detection of the downlink control channel may include at least one of a time-domain position of the downlink control channel, a frequency-domain position of the downlink control channel, a space-domain position of the downlink control channel, and indices of subcarriers where the downlink control channel is located. The control information for the detection of the data channel may include at least one of a resource position of the data channel, a modulation and coding scheme adopted by the data channel, and an HARQ process information corresponding to the data channel.

According to the sixth embodiment of the present disclosure, the network side device may indicate the one-stage transmission mode or the multiple-stage transmission mode through the high-layer control signaling, so as to reduce the detection complexity for the first downlink control channel at the UE. In addition, it is able for the network side device to control the UE to adjust the detection mode, e.g., the one-stage detection mode or the multiple-stage detection mode as mentioned hereinabove, for the downlink control channel, and adaptively adjust the detection mode, thereby to strike a balance between the reduction in the power consumption for the UE and the reduction in the detection complexity.

Seventh Embodiment

The downlink control channel detection method and the downlink control channel transmission method have been described in the above embodiments. Devices for implementing these methods will be described hereinafter.

Figure 7:
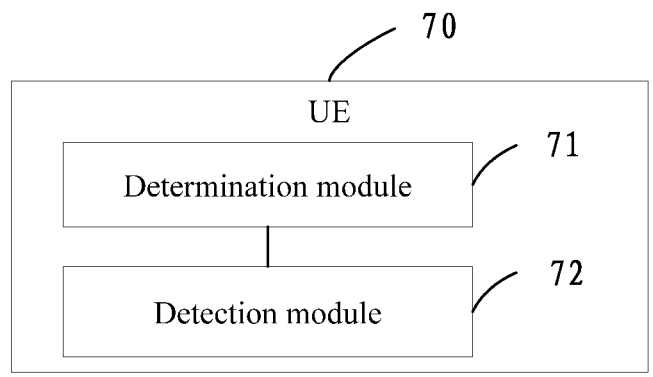
FIG. 7 is a schematic view showing a UE according to one embodiment of the present disclosure.

As shown in FIG. 7, the present disclosure provides in this embodiment a UE 70, which includes: a determination module 71 configured to determine a detection mode for a downlink control channel; and a detection module 72 configured to detect the downlink control channel in accordance with the determined detection mode for the downlink control channel. The detection mode for the downlink control channel includes a one-stage detection mode in which control information for the detection of a data channel is acquired through a single downlink control channel detection operation and a multiple-stage detection mode in which the control information for the detection of the data channel is acquired through at least two downlink control channel detection operations.

Figure 8:
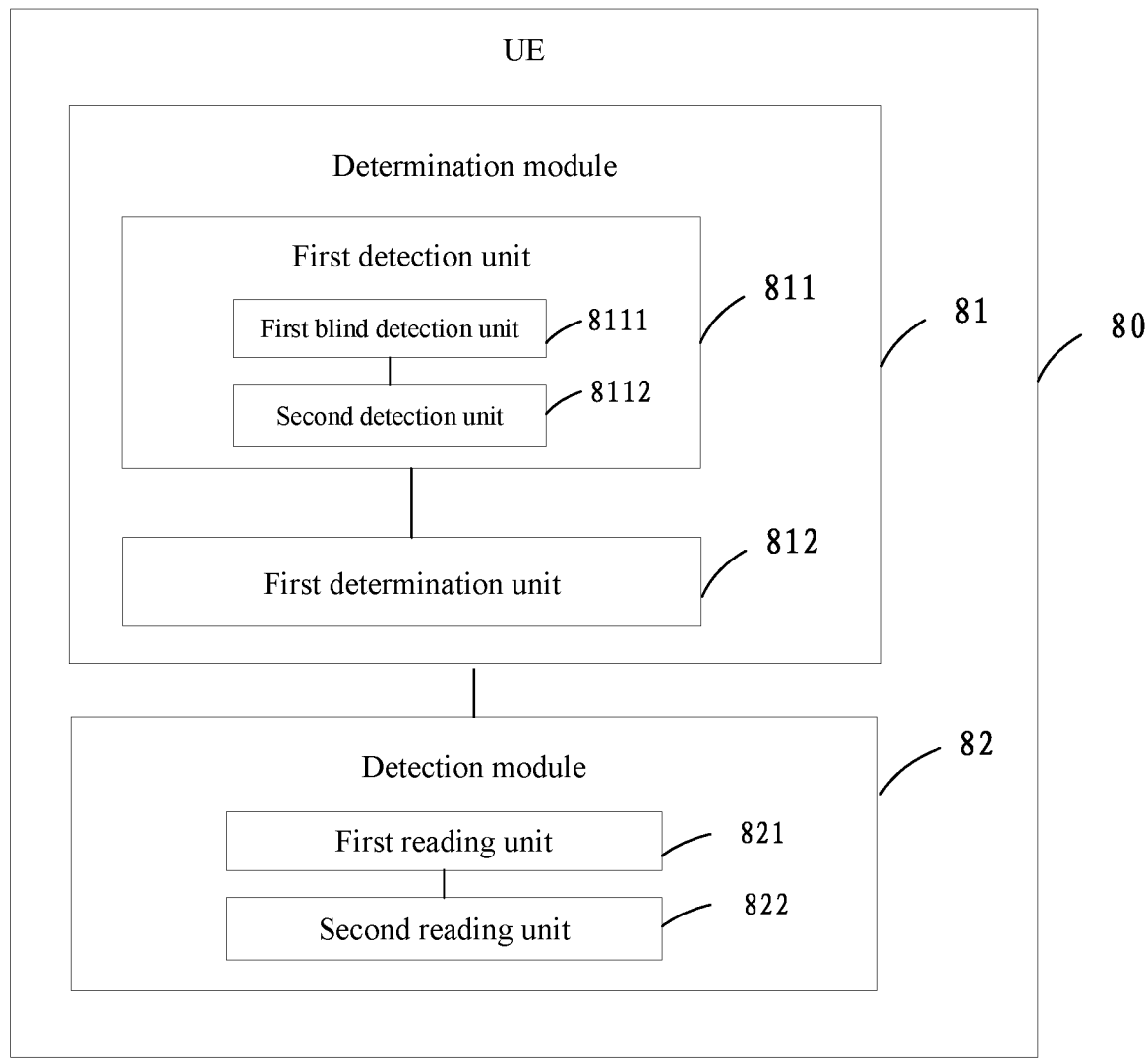
FIG. 8 is another schematic view showing the UE according to one embodiment of the present disclosure.

As shown in FIG. 8, the present disclosure further provides a UE 80, which includes: a determination module 81 configured to determine a detection mode for a downlink control channel; and a detection module 82 configured to detect the downlink control channel in accordance with the determined detection mode for the downlink control channel. The detection mode for the downlink control channel includes a one-stage detection mode in which control information for the detection of a data channel is acquired through a single downlink control channel detection operation and a multiple-stage detection mode in which the control information for the detection of the data channel is acquired through at least two downlink control channel detection operations.

As shown in FIG. 8, the determination module 81 may include: a first detection unit 811 configured to detect a first downlink control channel so as to acquire control signaling hierarchical information; and a first determination unit 812 configured to determine the detection mode for the downlink control channel in accordance with the control signaling hierarchical information. The control signaling hierarchical information may be adopted to indicate the detection mode for the downlink control channel.

The first detection unit 811 may include: a first blind direction unit 8111 configured to detect the first downlink control channel in a blind detection manner, and read the control signaling hierarchical information from the first downlink control channel; or a second detection unit 8112 configured to determine a resource position of the first downlink control channel in accordance with physical layer signaling or high-layer control signaling acquired in advance, detect the first downlink control channel, and read the control signaling hierarchical information from the first downlink control channel.

In a possible embodiment of the present disclosure, the detection module 82 may include: a first reading unit 821 configured to, when the determined detection mode for the downlink control channel is the one-stage detection mode, read the control information for the detection of the data channel from the first downlink control channel; and a second reading unit 822 configured to, when the determined detection mode for the downlink control channel is the multiple-stage detection mode, read control information for the detection of a next-stage downlink control channel from the first downlink control channel, and detect the downlink control channels stage by stage in accordance with the control information for the detection of the downlink control channels, until the control information for the detection of the data channel has been acquired.

Figure 9:
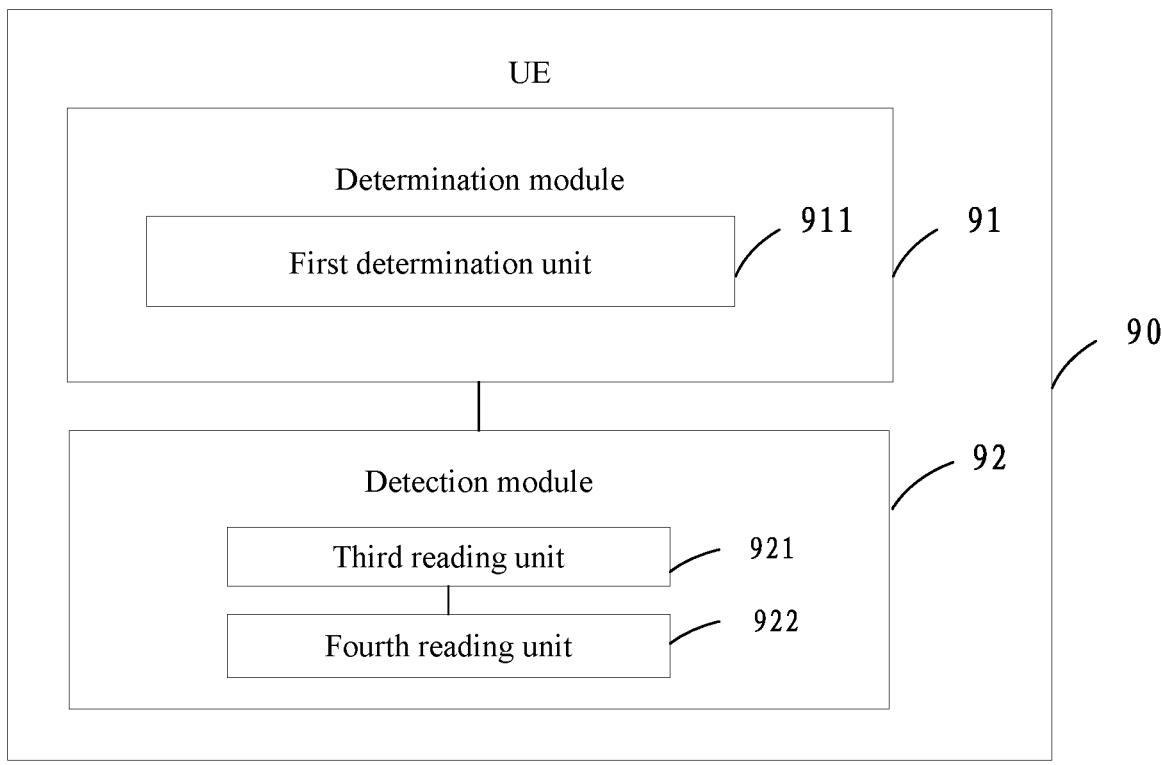
FIG. 9 is yet another schematic view showing the UE according to one embodiment of the present disclosure.

As shown in FIG. 9, the present disclosure further provides a UE 90, which includes: a determination module 91 configured to determine a detection mode for a downlink control channel; and a detection module 92 configured to detect the downlink control channel in accordance with the determined detection mode for the downlink control channel. The detection mode for the downlink control channel includes a one-stage detection mode in which control information for the detection of a data channel is acquired through a single downlink control channel detection operation and a multiple-stage detection mode in which the control information for the detection of the data channel is acquired through at least two downlink control channel detection operations.

As shown in FIG. 9, the determination module 91 may include a second determination unit 911 configured to determine the detection mode for the downlink control channel in accordance with high-layer control signaling received in advance. The high-layer control signaling may include RRC signaling or an MAC message.

In a possible embodiment of the present disclosure, the detection module 92 may include: a third reading unit 921 configured to, when the determined detection mode for the downlink control channel is the one-stage detection mode, detect a first downlink control channel in a blind detection manner or in accordance with physical layer signaling or high-layer control signaling acquired in advance, and read the control information for the detection of the data channel from the detected first downlink control channel; and a fourth reading unit 922 configured to, when the determined detection mode for the downlink control channel is the multiple-stage detection mode, detect the first downlink control channel in a blind detection manner or in accordance with the physical layer signaling or high-layer control signaling acquired in advance, read control information for the detection of a next-stage downlink control channel from the first downlink control channel, and detect the downlink control channels stage by stage in accordance with the control information for the detection of the downlink control channels, until the control information for the detection of the data channel has been acquired.

In this embodiment, the control information for the detection of the downlink control channel may include at least one of a time-domain position of the downlink control channel, a frequency-domain position of the downlink control channel, a space-domain position of the downlink control channel, and indices of subcarriers where the downlink control channel is located. The control information for the detection of the data channel may include at least one of a resource position of the data channel, a modulation and coding scheme adopted by the data channel, and an HARQ process information corresponding to the data channel.

According to the seventh embodiment of the present disclosure, the UE may perform one-stage detection or multiple-stage detection in accordance with the determined detection mode for the downlink control channel. As a result, it is able for the UE to support various detection modes for the downlink control channel, and adaptively adjust the detection mode, thereby to strike a balance between the reduction in the power consumption for the UE and the reduction in the detection complexity.

Eighth Embodiment

Figure 10:
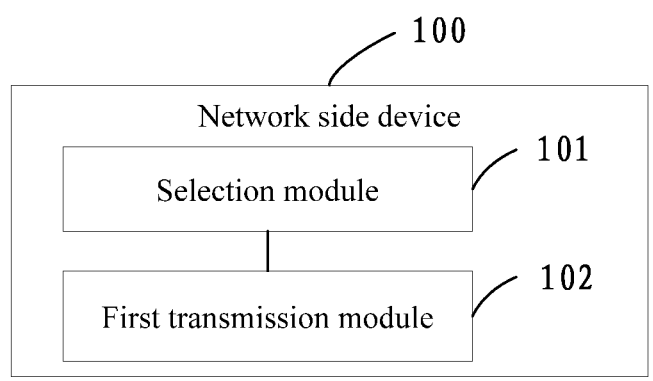
FIG. 10 is a schematic view showing a network side device according to one embodiment of the present disclosure.

As shown in FIG. 10, the present disclosure provides in this embodiment a network side device 100, which includes: a selection module 101 configured to select a transmission mode for a downlink control channel; and a first transmission module 102 configured to transmit the downlink control channel in accordance with the selected transmission mode for the downlink control channel. The transmission mode includes a one-stage transmission mode in which control information for the detection of a data channel is provided through the transmission of the downlink control channel for one time and a multiple-stage transmission mode in which the control information for the detection of the data channel is provided through the transmission of the downlink control channel for several times.

Figure 11:
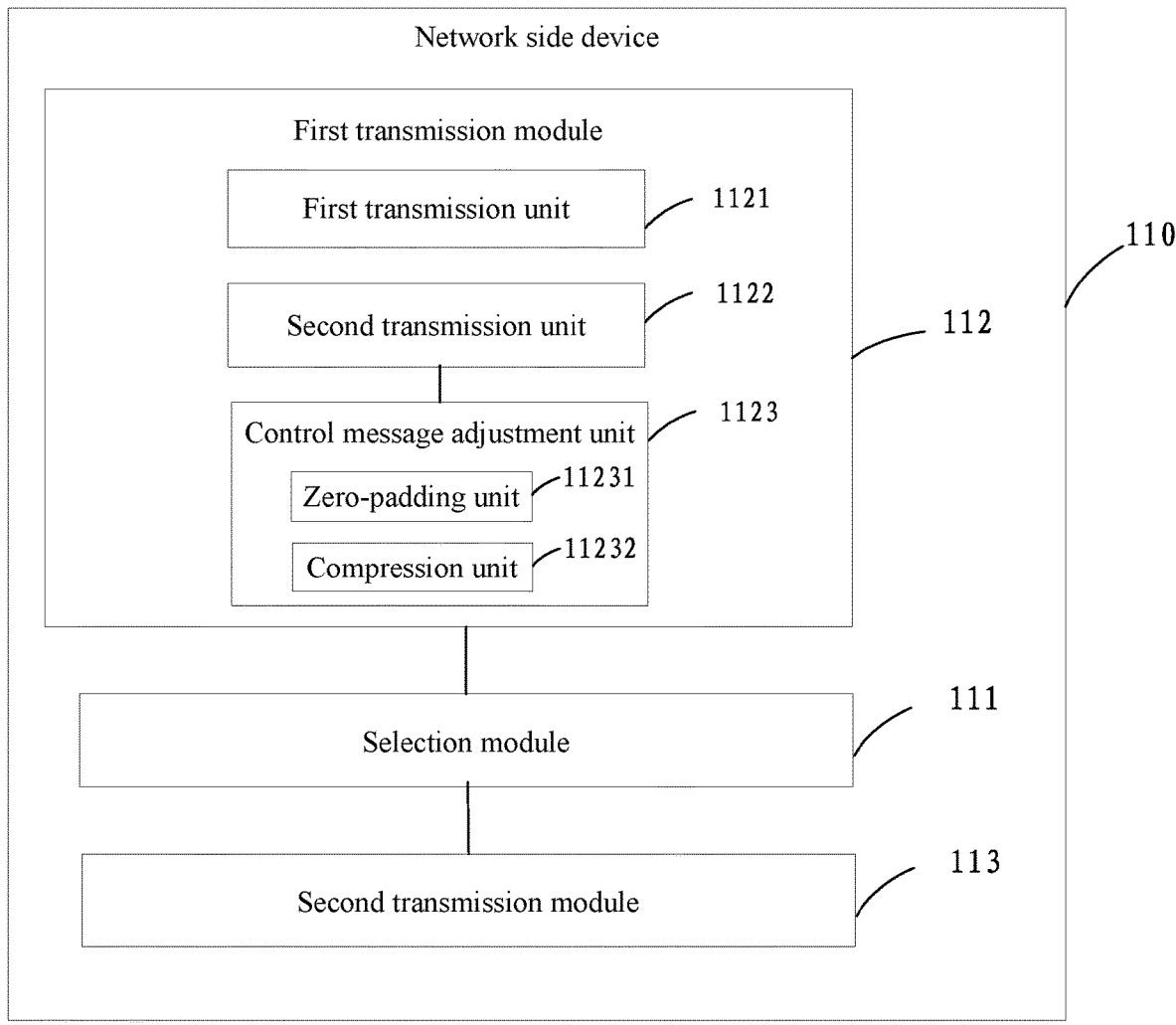
FIG. 11 is another schematic view showing the network side device according to one embodiment of the present disclosure.

As shown in FIG. 11, the present disclosure further provides a network side device 110, which includes: a selection module 111 configured to select a transmission mode for a downlink control channel; and a first transmission module 112 configured to transmit the downlink control channel in accordance with the selected transmission mode for the downlink control channel. The transmission mode includes a one-stage transmission mode in which control information for the detection of a data channel is provided through the transmission of the downlink control channel for one time and a multiple-stage transmission mode in which the control information for the detection of the data channel is provided through the transmission of the downlink control channel for several times.

Here, the first transmission module 112 may include: a first transmission unit 1121 configured to, when the selected transmission mode for the downlink control channel is the one-stage transmission mode, transmit signaling hierarchical information for indicating the one-stage transmission mode and the control information for the detection of the data channel on a first downlink control channel; and a second transmission unit 1122 configured to, when the selected transmission mode for the downlink control channel is the multiple-stage transmission mode, transmit the signaling hierarchical information for indicating the multiple-stage transmission mode on the first downlink control channel, transmit control information for the detection of a next-stage downlink control channel on a current-stage downlink control channel other than a last-stage downlink control channel, and transmit the control information for the detection of the data channel on the last-stage downlink control channel.

Here, the network side device 110 may further include a second transmission module 113 configured to, before the downlink control channel is transmitted by the first transmission module, transmit physical layer signaling or high-layer control signaling for indicating a resource position of the first downlink control channel to the UE.

Here, the first transmission module 112 may further include a control message adjustment unit 1123 configured to, when the selected transmission mode for the downlink control channel is the multiple-stage transmission mode, perform a zero-padding operation or a compression operation on a control message transmitted on each downlink control channel. The control messages acquired after the zero-padding operation or the compression operation may have a same length.

In a possible embodiment of the present disclosure, the control message adjustment unit 1123 may include a zero-padding unit 11231 configured to determine a maximum length of the control message transmitted on each downlink control channel, and perform the zero-padding operation on each control message having a length smaller than the maximum length, so as to acquire the control message after the zero-padding operation.

In another possible embodiment of the present disclosure, the control message adjustment unit 1123 may include a compression unit 11232 configured to determine a final length of the control message transmitted on each downlink control channel, discard a predetermined field in each control message having a length greater than the final length so as to acquire the control message after the compression operation, and transmit the discarded predetermined field to the UE via the high-layer control signaling.

Figure 12:
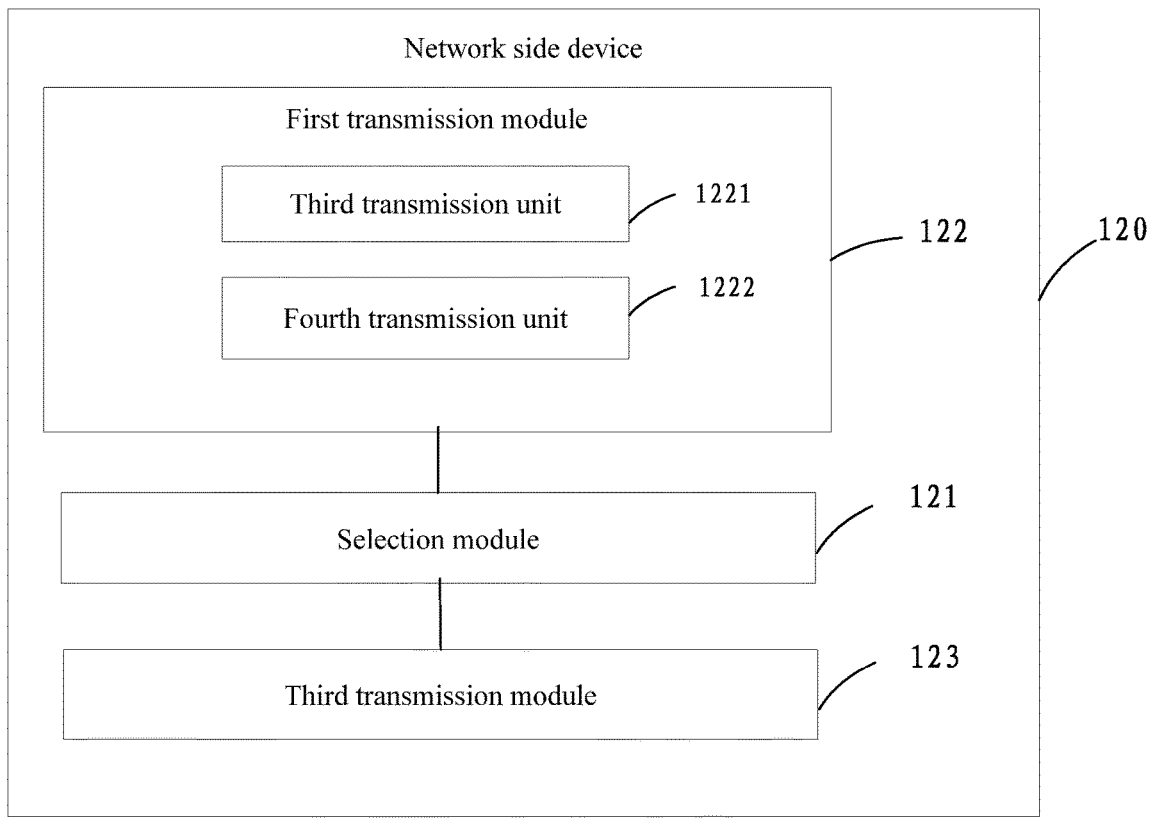
FIG. 12 is yet another schematic view showing the network side device according to one embodiment of the present disclosure.

As shown in FIG. 12, the present disclosure provides a network side device 120, which includes: a selection module 121 configured to select a transmission mode for a downlink control channel; and a first transmission module 122 configured to transmit the downlink control channel in accordance with the selected transmission mode for the downlink control channel. The transmission mode includes a one-stage transmission mode in which control information for the detection of a data channel is provided through the transmission of the downlink control channel for one time and a multiple-stage transmission mode in which the control information for the detection of the data channel is provided through the transmission of the downlink control channel for several times.

In a possible embodiment of the present disclosure, the first transmission module 122 may include: a third transmission unit 1221 configured to, when the selected transmission mode for the downlink control channel is the one-stage transmission mode, transmit the control information for the detection of the data channel on a first downlink control channel; and a fourth transmission unit 1222 configured to, when the selected transmission mode for the downlink control channel is the multiple-stage transmission mode, transmit control information for the detection of a next-stage downlink control channel on a current-stage downlink control channel other than a last-stage downlink control channel, and transmit the control information for the detection of the data channel on the last-stage downlink control channel.

Here, the network side device 120 may further include a third transmission module 123 configured to, before the downlink control channel is transmitted by the first transmission module, transmit physical layer signaling or high-layer control signaling for indicating a detection mode of the downlink control channel to the UE. The detection modes for the downlink control channel may correspond to the transmission modes for the downlink control channel respectively.

In this embodiment, the control information for the detection of the downlink control channel may include at least one of a time-domain position of the downlink control channel, a frequency-domain position of the downlink control channel, a space-domain position of the downlink control channel, and indices of subcarriers where the downlink control channel is located. The control information for the detection of the data channel may include at least one of a resource position of the data channel, a modulation and coding scheme adopted by the data channel, and an HARQ process information corresponding to the data channel.

According to the eighth embodiment of the present disclosure, it is able for the network side device to control the UE to adjust the detection mode, e.g., the one-stage detection mode or the multiple-stage detection mode, for the downlink control channel, and adaptively adjust the detection mode, thereby to strike a balance between the reduction in the power consumption for the UE and the reduction in the detection complexity.

Ninth Embodiment

Figure 13:
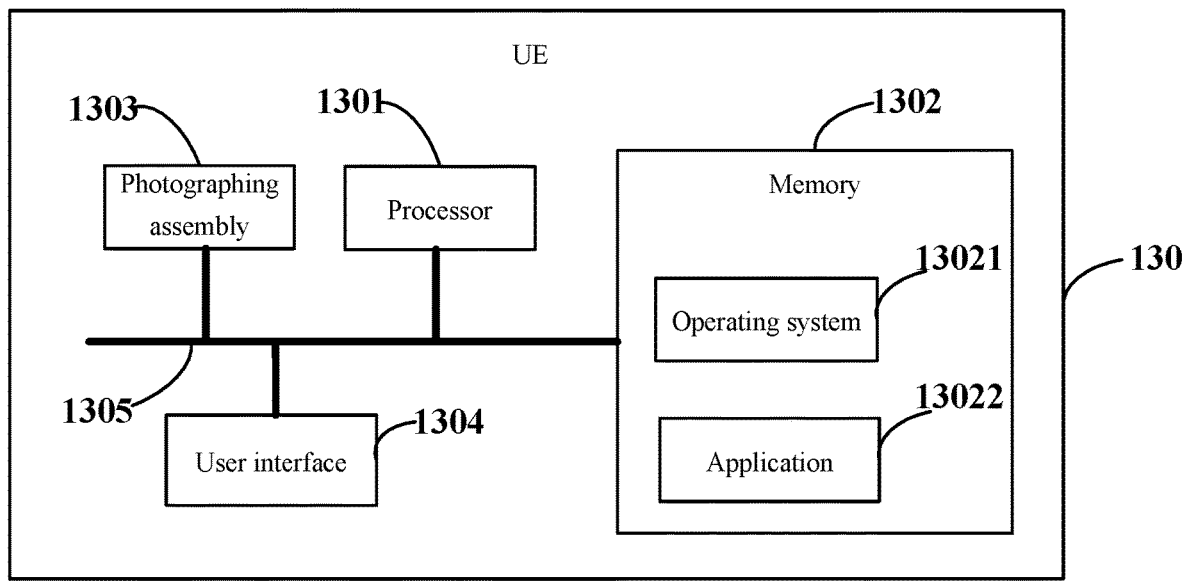
FIG. 13 is a block diagram of the UE according to one embodiment of the present disclosure.

As shown in FIG. 13, the present disclosure provides in this embodiment a UE 130, which includes at least one processor 1301, a memory 1302, a photographing assembly 1303 and a user interface 1304. The components of the UE 1300 are coupled to each other via a bus system 1305. It should be appreciated that, the bus system 1305 is configured to achieve communication among the components. The bus system 1305 may include, apart from a data bus, a power source bus, a control bus, and a status signal bus. For clarification, all the buses in FIG. 8 may be collectively marked as the bus system 1305.

The user interface 1304 may include a display or a pointing device (e.g., a touch pad or touch panel).

It should be appreciated that, the memory 1302 may include a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but not restrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 1302 intends to include, but not limited to, the above-mentioned and any other appropriate memories.

In a possible embodiment of the present disclosure, the following elements may be stored in the memory 1302: an executable module or data structure, a subset or an extended set thereof, an operating system 13021 and an application 13022.

The operating system 13021 may include various system programs, e.g., a framework layer, a core layer and a driving layer, so as to implement various basic services and process hardware-based tasks. The application 13022 may include various applications, e.g., Media Player and Browser, so as to implement various application services. The programs for implementing the above-mentioned method may be included in the application 13022.

In this embodiment, through calling a program or instruction stored in the memory 1302, e.g., a program or instruction stored in the application 13022, the processor 1301 is configured to: determine a detection mode for a downlink control channel; and detect the downlink control channel in accordance with the determined detection mode for the downlink control channel. The detection mode for the downlink control channel may include a one-stage detection mode in which control information for the detection of a data channel is acquired through a single downlink control channel detection operation and a multiple-stage detection mode in which the control information for the detection of the data channel is acquired through at least two downlink control channel detection operations.

The above-mentioned method may be applied to, or implemented by, the processor 1301. The processor 1301 may be an integrated circuit (IC) having a signal processing capability. During the implementation, the steps of the above-mentioned method may be completed through an integrated logic circuit of hardware in the processor 1301 or instructions in the form of software. The processor 1301 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 1302, and the processor 1301 may read information stored in the memory 1302 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

To be specific, the processor 1301 is further configured to detect a first downlink control channel so as to acquire control signaling hierarchical information, and determine the detection mode for the downlink control channel in accordance with the control signaling hierarchical information. The control signaling hierarchical information may be adopted to indicate the detection mode for the downlink control channel.

To be specific, the processor 1301 is further configured to: detect the first downlink control channel in a blind detection manner, and read the control signaling hierarchical information from the first downlink control channel; or determine a resource position of the first downlink control channel in accordance with physical layer signaling or high-layer control signaling acquired in advance, detect the first downlink control channel, and read the control signaling hierarchical information from the first downlink control channel.

To be specific, the processor 1301 is further configured to, when the determined detection mode for the downlink control channel is the one-stage detection mode, read the control information for the detection of the data channel from the first downlink control channel.

In addition, the processor 1301 is further configured to, when the determined detection mode for the downlink control channel is the multiple-stage detection mode, read control information for the detection of a next-stage downlink control channel from the first downlink control channel, and detect the downlink control channels stage by stage in accordance with the control information for the detection of the downlink control channels, until the control information for the detection of the data channel has been acquired.

The processor 1301 is further configured to determine the detection mode for the downlink control channel in accordance with high-layer control signaling received in advance. The high-layer control signaling may include RRC signaling or an MAC message.

The processor 1301 is further configured to, when the determined detection mode for the downlink control channel is the one-stage detection mode, detect a first downlink control channel in a blind detection manner or in accordance with physical layer signaling or high-layer control signaling acquired in advance, and read the control information for the detection of the data channel from the detected first downlink control channel.

The processor 1301 is further configured to, when the determined detection mode for the downlink control channel is the multiple-stage detection mode, detect the first downlink control channel in a blind detection manner or in accordance with the physical layer signaling or high-layer control signaling acquired in advance, read control information for the detection of a next-stage downlink control channel from the first downlink control channel, and detect the downlink control channels stage by stage in accordance with the control information for the detection of the downlink control channels, until the control information for the detection of the data channel has been acquired.

To be specific, the control information for the detection of the downlink control channel may include at least one of a time-domain position of the downlink control channel, a frequency-domain position of the downlink control channel, a space-domain position of the downlink control channel, and indices of subcarriers where the downlink control channel is located. The control information for the detection of the data channel may include at least one of a resource position of the data channel, a modulation and coding scheme adopted by the data channel, and an HARQ process information corresponding to the data channel.

According to the ninth embodiment of the present disclosure, the UE 1300 may perform one-stage detection or multiple-stage detection in accordance with the determined detection mode for the downlink control channel. As a result, it is able for the UE to support various detection modes for the downlink control channel, and adaptively adjust the detection mode, thereby to strike a balance between the reduction in the power consumption for the UE and the reduction in the detection complexity.

Tenth Embodiment

Figure 14:
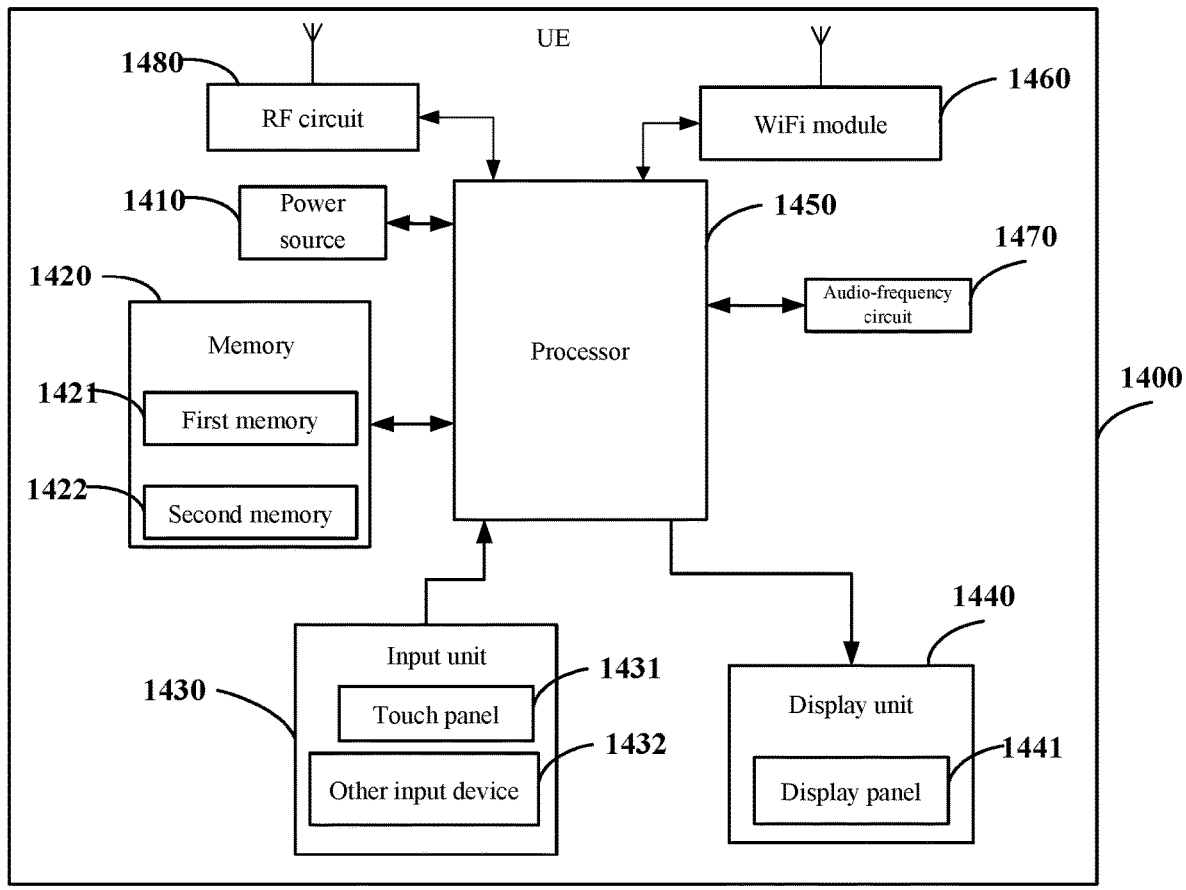
FIG. 14 is another block diagram of the UE according to one embodiment of the present disclosure.

As shown in FIG. 14, the present disclosure provides in this embodiment a UE 1400, which may be a mobile phone, a flat-panel computer, a PDA or a vehicle-mounted computer.

The UE 1400 may include a power source 1410, a memory 1420, an input unit 1430, a display unit 1440, a photographing assembly 1450, a processor 1460, a Wireless Fidelity (WiFi) module 1470, an audio-frequency circuit 1480, and a radio frequency (RF) circuit 14140. The photographing assembly 1450 may include a first camera and a second camera.

The input unit 1430 is configured to receive information inputted by a user, and generate a signal input related to user settings and function control of the UE 1400. To be specific, the input unit 1430 may include a touch panel 1431, also called as touch screen, which is configured to collect a touch operation made by the user on or in proximity to the touch panel (e.g., an operation made by the user through any appropriate object or attachment (e.g., finger or stylus) on or in the proximity to the touch panel 1431). In a possible embodiment of the present disclosure, the touch panel 1431 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 1460, and receive and execute a command from the processor 1460. In addition, the touch panel 1431 may be of a resistive type, a capacitive type, an infrared type or a surface acoustic wave (SAW) type. The input unit 1430 may further include an input device 1432 which includes, but not limited to, a physical keyboard, a functional button (e.g., a volume control button or an on/off button), a trackball, a mouse, and a joystick.

The display unit 1440 is configured to display information inputted by the user or information to be presented to the user, and various interfaces for the UE, and it may include a display panel 1441. In a possible embodiment of the present disclosure, the display panel 1441 may be a Liquid Crystal Display (LCD) panel or an Organic Light-Emitting Diode (OLED) panel.

It should be appreciated that, the touch panel 1431 may cover the display panel 1441, so as to form a touch display panel. When the touch operation made on or in proximity to the touch display panel has been detected, the touch information may be transmitted to the processor 1460 so as to determine a type of a touch event. Then, the processor 1460 may provide corresponding visual output on the touch display panel in accordance with the type of the touch event.

The touch display panel may include an application interface display region and a commonly-used controls display region. An arrangement mode of the two display regions will not be particularly defined herein, e.g., one of the two display regions may be arranged above or under the other, or arranged to the left or the right of the other. The application interface display region may be adopted to display interfaces for applications, and each interface may include an icon for at least one application and/or an interface element such as Widget desktop control. The application interface display region may also be a blank interface where no content is contained. The commonly-used controls display region may be adopted to display controls which are used frequently, e.g., setting button, interface number, scroll bar, or such application icons as telephone book icon.

The processor 1460 is a control center of the UE, and connected to each member of the entire UE via various interfaces and lines. The processor 1460 is configured to run or execute software programs and/or modules stored in a first memory 1421, and call data stored in a second memory 1422, so as to achieve various functions of the UE and process the data, thereby to monitor the UE. In a possible embodiment of the present disclosure, the processor 1460 may include one or more processing units.

In this embodiment, the processor 1460 is configured to call the software programs and/or modules stored in the first memory 1421 and/or the data stored in the second memory 1422, so as to determine a detection mode for a downlink control channel, and detect the downlink control channel in accordance with the determined detection mode for the downlink control channel. The detection mode for the downlink control channel includes a one-stage detection mode in which control information for the detection of a data channel is acquired through a single downlink control channel detection operation and a multiple-stage detection mode in which the control information for the detection of the data channel is acquired through at least two downlink control channel detection operations.

To be specific, the processor 1460 is further configured to detect a first downlink control channel so as to acquire control signaling hierarchical information, and determine the detection mode for the downlink control channel in accordance with the control signaling hierarchical information. The control signaling hierarchical information may be adopted to indicate the detection mode for the downlink control channel.

To be specific, the processor 1460 is further configured to: detect the first downlink control channel in a blind detection manner, and read the control signaling hierarchical information from the first downlink control channel; or determine a resource position of the first downlink control channel in accordance with physical layer signaling or high-layer control signaling acquired in advance, detect the first downlink control channel, and read the control signaling hierarchical information from the first downlink control channel.

To be specific, the processor 1460 is further configured to, when the determined detection mode for the downlink control channel is the one-stage detection mode, read the control information for the detection of the data channel from the first downlink control channel.

In addition, the processor 1460 is further configured to, when the determined detection mode for the downlink control channel is the multiple-stage detection mode, read control information for the detection of a next-stage downlink control channel from the first downlink control channel, and detect the downlink control channels stage by stage in accordance with the control information for the detection of the downlink control channels, until the control information for the detection of the data channel has been acquired.

The processor 1460 is further configured to determine the detection mode for the downlink control channel in accordance with high-layer control signaling received in advance. The high-layer control signaling may include RRC signaling or an MAC message.

The processor 1460 is further configured to, when the determined detection mode for the downlink control channel is the one-stage detection mode, detect a first downlink control channel in a blind detection manner or in accordance with physical layer signaling or high-layer control signaling acquired in advance, and read the control information for the detection of the data channel from the detected first downlink control channel.

The processor 1460 is further configured to, when the determined detection mode for the downlink control channel is the multiple-stage detection mode, detect the first downlink control channel in a blind detection manner or in accordance with the physical layer signaling or high-layer control signaling acquired in advance, read control information for the detection of a next-stage downlink control channel from the first downlink control channel, and detect the downlink control channels stage by stage in accordance with the control information for the detection of the downlink control channels, until the control information for the detection of the data channel has been acquired.

To be specific, the control information for the detection of the downlink control channel may include at least one of a time-domain position of the downlink control channel, a frequency-domain position of the downlink control channel, a space-domain position of the downlink control channel, and indices of subcarriers where the downlink control channel is located. The control information for the detection of the data channel may include at least one of a resource position of the data channel, a modulation and coding scheme adopted by the data channel, and an HARQ process information corresponding to the data channel.

According to the tenth embodiment of the present disclosure, the UE 1400 may perform one-stage detection or multiple-stage detection in accordance with the determined detection mode for the downlink control channel. As a result, it is able for the UE to support various detection modes for the downlink control channel, and adaptively adjust the detection mode, thereby to strike a balance between the reduction in the power consumption for the UE and the reduction in the detection complexity.

Eleventh Embodiment

Figure 15:
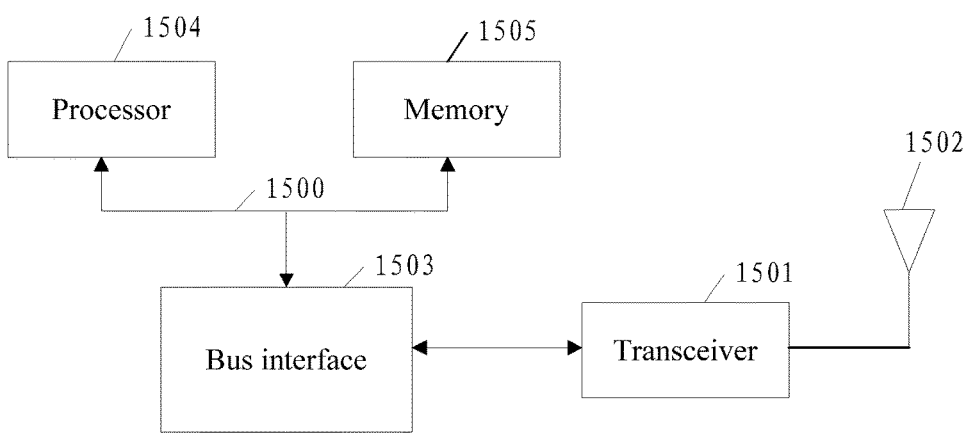
FIG. 15 is a block diagram of the network side device according to one embodiment of the present disclosure.

As shown in FIG. 15, the present disclosure provides in this embodiment a network side device which includes a transceiver 1501, a processor 1504 and a memory 1505. The transceiver 1501 is configured to receive and transmit data under the control of the processor 1504. To be specific, the transceiver 1501 may receive a paging message capable of determining a paging type from a base station, and the paging type may include an access network paging operation initiated by an access network or a core network paging operation initiated by a core network. The processor 1504 is configured to read a program stored in the memory 1505, so as to: select a transmission mode for a downlink control channel; and transmit the downlink control channel in accordance with the selected transmission mode for the downlink control channel. The transmission mode may include a one-stage transmission mode in which control information for the detection of a data channel is provided through the transmission of the downlink control channel for one time and a multiple-stage transmission mode in which the control information for the detection of the data channel is provided through the transmission of the downlink control channel for several times.

In FIG. 15, bus architecture (represented by a bus 1500) may include a number of buses and bridges connected to each other, so as to connect various circuits for one or more processors 1504 and one or more memories 1505. In addition, as is known in the art, the bus 1500 may be used to connect any other circuits, such as a circuit for a peripheral device, a circuit for a voltage stabilizer and a power management circuit, which are not particularly defined herein. A bus interface 1503 may be provided between the bus 1500 and the transceiver 1501, and the transceiver 1501 may consist of one element, or more than one element, e.g., a transmitter and a receiver for communication with any other devices over a transmission medium. Data processed by the processor 1504 may be transmitted on a wireless medium through the transceiver 1501 and an antenna 1502. Further, the antenna 1502 may receive data and transmit the data to the processor 1504 via the transceiver 1501. The processor 1504 may take charge of managing the bus 1500 as well general processings, and may further provide various functions such as timing, peripheral interfacing, voltage adjustment, power source management and any other control functions. The memory 1505 may store therein data desired for the operation of the processor 1504. To be specific, the processor 1504 may be a Central Processing Unit (CPU), an Application Specific Integrated Circuit (ASIC), a Field-Programmable Gate Array (FPGA) or a Complex Programmable Logic Device (CPLD).

In a possible embodiment of the present disclosure, the processor 1504 is further configured to, when the selected transmission mode for the downlink control channel is the one-stage transmission mode, transmit signaling hierarchical information for indicating the one-stage transmission mode and the control information for the detection of the data channel on a first downlink control channel.

In a possible embodiment of the present disclosure, the processor 1504 is further configured to, when the selected transmission mode for the downlink control channel is the multiple-stage transmission mode, transmit the signaling hierarchical information for indicating the multiple-stage transmission mode on the first downlink control channel, transmit control information for the detection of a next-stage downlink control channel on a current-stage downlink control channel other than a last-stage downlink control channel, and transmit the control information for the detection of the data channel on the last-stage downlink control channel.

In a possible embodiment of the present disclosure, the processor 1504 is further configured to transmit physical layer signaling or high-layer control signaling for indicating a resource position of the first downlink control channel to the UE.

In a possible embodiment of the present disclosure, the processor 1504 is further configured to, when the selected transmission mode for the downlink control channel is the multiple-stage transmission mode, perform a zero-padding operation or a compression operation on a control message transmitted on each downlink control channel. The control messages acquired after the zero-padding operation or the compression operation may have a same length.

In a possible embodiment of the present disclosure, the processor 1504 is further configured to determine a maximum length of the control message transmitted on each downlink control channel, and perform the zero-padding operation on each control message having a length smaller than the maximum length, so as to acquire the control message after the zero-padding operation.

In a possible embodiment of the present disclosure, the processor 1504 is further configured to determine a final length of the control message transmitted on each downlink control channel, discard a predetermined field in each control message having a length greater than the final length so as to acquire the control message after the compression operation, and transmit the discarded predetermined field to the UE via the high-layer control signaling.

In a possible embodiment of the present disclosure, the processor 1504 is further configured to, when the selected transmission mode for the downlink control channel is the one-stage transmission mode, transmit the control information for the detection of the data channel on a first downlink control channel.

In a possible embodiment of the present disclosure, the processor 1504 is further configured to, when the selected transmission mode for the downlink control channel is the multiple-stage transmission mode, transmit control information for the detection of a next-stage downlink control channel on a current-stage downlink control channel other than a last-stage downlink control channel, and transmit the control information for the detection of the data channel on the last-stage downlink control channel.

In a possible embodiment of the present disclosure, the processor 1504 is further configured to transmit physical layer signaling or high-layer control signaling for indicating a detection mode of the downlink control channel to the UE. The detection modes for the downlink control channel may correspond to the transmission modes for the downlink control channel respectively.

Here, the control information for the detection of the downlink control channel may include at least one of a time-domain position of the downlink control channel, a frequency-domain position of the downlink control channel, a space-domain position of the downlink control channel, and indices of subcarriers where the downlink control channel is located. The control information for the detection of the data channel may include at least one of a resource position of the data channel, a modulation and coding scheme adopted by the data channel, and an HARQ process information corresponding to the data channel.

According to the eleventh embodiment of the present disclosure, it is able for the network side device to control the UE to adjust the detection mode, e.g., the one-stage detection mode or the multiple-stage detection mode, for the downlink control channel, and adaptively adjust the detection mode, thereby to strike a balance between the reduction in the power consumption for the UE and the reduction in the detection complexity.

For ease of understanding, the detection of the downlink control channel will be described hereinafter by taking a two-stage detection mode as an example.

Figure 16:
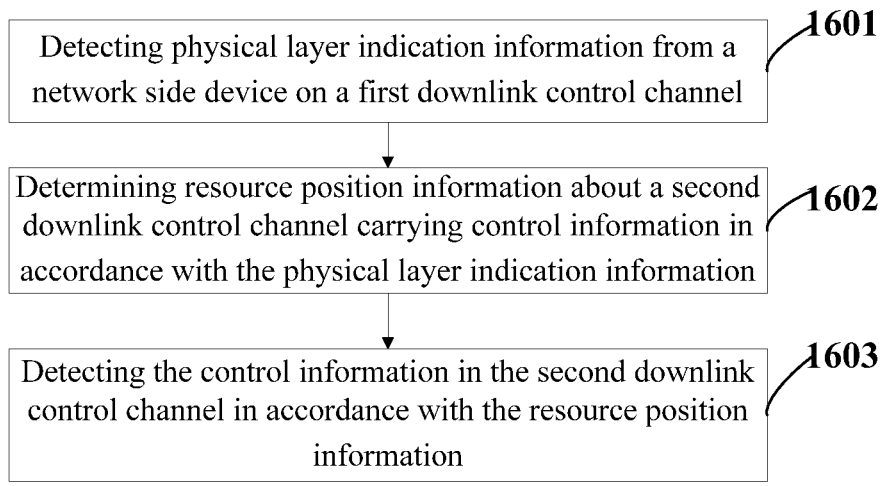
FIG. 16 is a flow chart of a downlink control channel detection method according to one embodiment of the present disclosure.

As shown in FIG. 16, the present disclosure provides a downlink control channel detection method, which includes the following steps.

Step 1601: detecting physical layer indication information from a network side device on a first downlink control channel.

The first downlink control channel may be a physical downlink control channel or a physical downlink shared channel. The physical layer indication information may refer to physical layer control signaling, and it may be adopted to indicate resource position information about a second downlink control channel carrying control information. Through the physical layer control signaling, it is able to reduce the detection complexity at the UE to some extent, thereby to reduce the processing resources for the UE.

Step 1602: determining the resource position information about the second downlink control channel carrying the control information in accordance with the physical layer indication information.

After the acquisition of the physical layer indication information through the detection of the first downlink control channel, the UE may parse the physical layer indication information, so as to determine the resource position information about the second downlink control channel for the control information issued by the network side device to the UE.

Step 1603: detecting the control information in the second downlink control channel in accordance with the resource position information.

The UE may parse the received physical layer indication information to acquire the corresponding resource position information, and then detect the second downlink control channel corresponding to the resource position information. In this way, merely the downlink control channel carrying the control information may be detected, and it is unnecessary to detect all the downlink control channels, so it is able to reduce the quantity of the detection operations made by the UE, thereby to reduce the power consumption.

According to the eleventh embodiment of the present disclosure, the UE may detect the first downlink control channel to acquire the indication information from the network side device, parse the indication information to determine the resource position information about the second downlink control channel carrying the downlink control information, and then detect the downlink control information merely in the second downlink control channel indicated in the indication information. As a result, it is able to reduce the quantity of the detection operations made by the UE, thereby to reduce the power consumption. In addition, discontinuous transmission configuration signaling, which should have been performed at L2/L3, may be indicated by the physical layer indication information, so it is able to reduce the detection complexity at the UE.

Twelfth Embodiment

The downlink control channel detection method has been described briefly in the first embodiment, and it will be described hereinafter in conjunction with the drawings and a specific application scenario.

Figure 17:
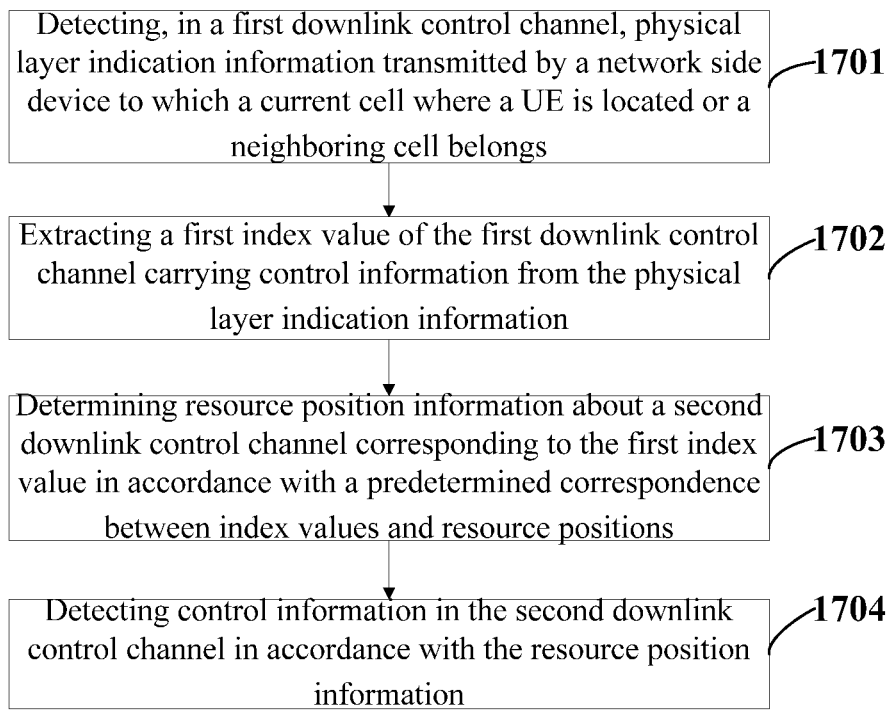
FIG. 17 is another flow chart of the downlink control channel detection method according to one embodiment of the present disclosure.

As shown in FIG. 17, the downlink control detection method may include the following steps.

Step 1701: detecting, in a first downlink control channel, physical layer indication information transmitted by a network side device to which a current cell where a UE is located or a neighboring cell belongs.

Here, different cells, sectors or combinations thereof may have different physical layer indication information, or share the same physical layer indication information. Generally, the same physical layer indication information may be shared by neighboring cells. For example, the UE may detect the first downlink control channel, so as to acquire the physical layer indication information issued from the network side device to which the current cell belongs, and the physical layer indication information may be adopted to indicate resource position information about a second downlink control channel carrying control information in the current cell. Alternatively, the UE may detect the first downlink control channel, so as to acquire the physical layer indication information issued from the network side device to which the neighboring cell belongs, and the neighboring cell may share the same physical layer indication information with the current cell. At this time, the UE may also acquire resource position information about the second downlink control channel carrying the control information in the current cell in accordance with the physical layer indication information received from the network side device to which the neighboring cell belongs.

Further, Step 1701 may include: acquiring high-layer control signaling from the network side device; determining a transmission period of the physical layer indication information and an offset amount for the transmission of the physical layer indication information in accordance with the high-layer control signaling; determining a subframe number for the downlink control channel carrying the physical layer indication information in accordance with the transmission period and the offset amount; and detecting the physical layer indication information from the network side device in the downlink control channel corresponding to the subframe number.

Figure 18:
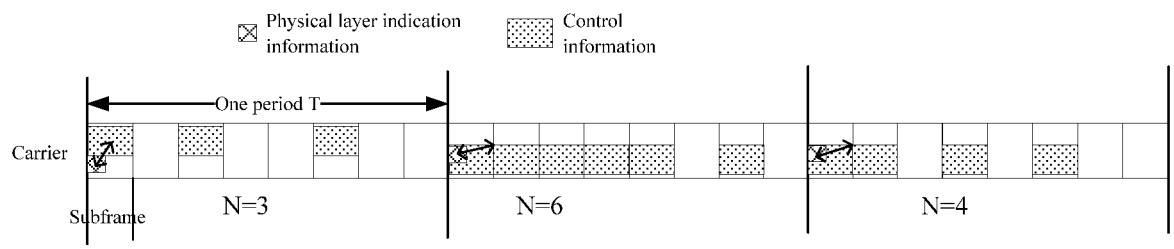
FIG. 18 is a schematic view showing a self-scheduling control channel according to one embodiment of the present disclosure.
Figure 19:
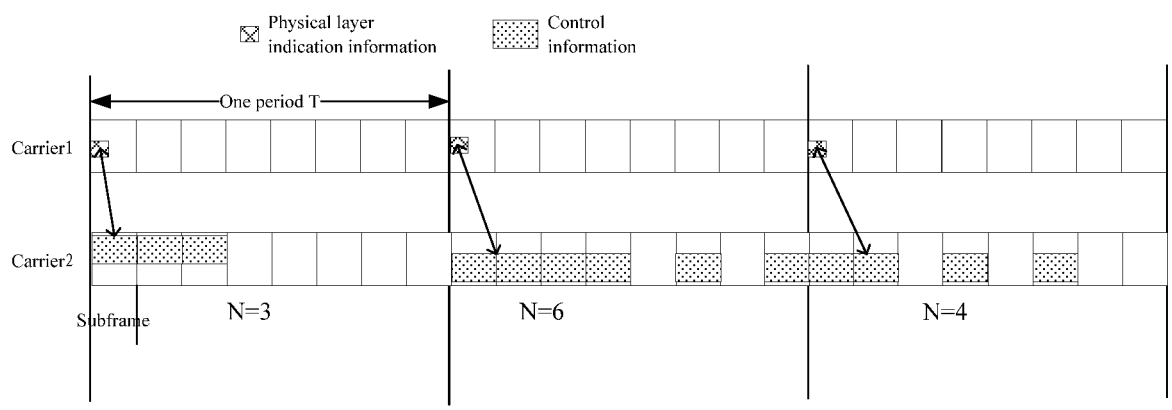
FIG. 19 is another schematic view showing the self-scheduling control channel according to one embodiment of the present disclosure.

To be specific, the step of determining the subframe number for the downlink control channel carrying the physical layer indication information in accordance with the transmission period and the offset amount may include determining the subframe number for the downlink control channel carrying the physical layer indication information through the formula idx mod T=offset, where idx represents the subframe number for the downlink control channel carrying the physical layer indication information, T represents the transmission period of the physical layer indication information, offset represents the offset amount for the transmission of the physical layer indication information (T and offset are notified through high-layer signaling), and mod represents a modular operation. In other words, the subframe number idx=N*T+offset, and the downlink control channel may be probably transmitted in a subframe merely when the idx of the subframe meets the above equation. As shown in FIGS. 18 and 19, the UE may parse high-layer control signaling, so as to determine that the transmission period of the physical layer indication information includes 8 subframes and the offset amount is 0, i.e., the UE may detect whether there is the physical layer indication information within the subframe whose subframe number is an integral multiple of 8 minus 1 (starting from a subframe #0). As shown in FIG. 18, the physical layer indication information detected within a first transmission period indicates that there are three (N=3) second downlink control channels carrying the control information, and the resource positions corresponding to the three second downlink control channels are indicated by the arrows. The physical layer indication information detected within a second transmission period indicates that there are six (N=6) second downlink control channels carrying the control information, and the resource positions corresponding to the six second downlink control channels are indicated by the arrows. The physical layer indication information detected within a third transmission period indicates that there are four (N=4) second downlink control channels carrying the control information, and the resource positions corresponding to the four second downlink control channels are indicated by the arrows. The detection and indication modes in FIG. 19 are substantially the same as those in FIG. 18, and thus will not be particularly defined herein.

Subsequent to detecting the physical layer indication information from the network side device in the downlink control channel corresponding to the subframe number, the downlink control channel detection method may further include: when no physical layer indication information has been detected, transmitting a Negative Acknowledgement (NACK) message to the network side device; or determining that no physical layer indication information is carried in the downlink control channel corresponding to the subframe number. In other words, after the detection of the physical layer indication information, the UE may process a detection result in a transmission-with-acknowledgement mode or in a transmission-without-acknowledgement mode.

In the transmission-with-acknowledgement mode, the UE may periodically detect the downlink control channel in accordance with the high-layer signaling. For example, the UE determine the transmission period T of the physical layer indication information and the offset amount offset in accordance with the high-layer signaling, and then detect the physical layer indication information within a subframe whose subframe number meets the equation idx mod T=offset. When the UE fails to detect any physical layer indication information within the subframe with the subframe number, it may transmit the NACK message to the network side device, so as to notify the network side device of the fact that there is erroneous information.

In the transmission-without-acknowledgement mode, the UE may periodically detect the downlink control channel in accordance with the high-layer signaling. For example, the UE determine the transmission period T of the physical layer indication information and the offset amount offset in accordance with the high-layer signaling, and then detect the physical layer indication information within a subframe whose subframe number meets the equation idx mod T=offset. When the UE fails to detect any physical layer indication information within the subframe with the subframe number, it may consider that there is no control information to be detected within the subframe (it may not transmit the NACK message to the network side device either).

It should be appreciated that, apart from through the above-mentioned high-layer signaling, the UE may also detect the first downlink control channel to acquire the physical layer indication information in a blind detection manner or through a priori physical layer, which will not be particularly defined herein. It should be further appreciated that, all ways for the implementation of Step 1701 may also be adapted to the implementation of Step 1601.

Step 1702: extracting a first index value of the first downlink control channel carrying the control information from the physical layer indication information.

The physical layer indication information may be carried in a predetermined special field, and different values of the special field may correspond to different resource positions. The index value may be a value of the special field, or a code having a certain mapping relationship with the value of the special field.

Step 1703: determining resource position information about a second downlink control channel corresponding to the first index value in accordance with a predetermined correspondence between the index values and the resource positions.

The resource position information about the second downlink control channel may include at least one of a number of a downlink subframe where the second downlink control channel is located, a frequency-domain position, a space-domain position and a carrier number. Further, in order to reduce the quantity of bytes occupied by the index value, possible values of the special field may form an index table in a certain combination mode. As shown in Table 6, the index table may show a correspondence between the index values and the possible values of the special field indicating the resource position. Different values of the special field may correspond to different resource positions, so it is merely necessary to parse the index value of the physical layer indication information, and then acquire the resource position of the corresponding downlink control channel through looking up the table.

TABLE 6

| Index value | Subframe number xx | Frequency-domain position yy | Space-domain position zz | Carrier number ww |
|---|---|---|---|---|
| 001 | xx1 | yy1 | zz1 | ww1 |
| 002 | xx2 | yy2 | zz2 | ww2 |
| ... | xx ... | yy ... | zz ... | ww ... |
| 016 | xx16 | yy16 | zz16 | ww16 |

Each index value is a code having a certain mapping relationship with the value of the special field, field xx indicates the subframe number, field yy indicates the frequency-domain position, field zz indicates the space-domain position, and field ww indicates the carrier number. Here, the values of the fields corresponding to the first index value may be determined through looking up the table, so it is able to acquire the resource position in accordance with the values of the fields.

Step 1704: detecting control information in the second downlink control channel in accordance with the resource position information.

The control information may include resource position information about a transmission channel carrying service data, e.g., time-frequency resource allocation, and Modulation and Coding Scheme (MCS). In order to further reduce the detection complexity at the UE, the control information may also be transmitted by the network side device in physical layer signaling, i.e., the control information may be physical layer control information.

Further, the physical layer indication information may indicate the control information transmitted within a same carrier, or indicate the control information transmitted in different carriers from the physical layer indication information. In other words, the physical layer indication information and the control information may be transmitted from the network side device in a single carrier (as shown in FIG. 18) or in multiple carriers (as shown in FIG. 19, where the physical layer indication information is transmitted in carrier1 while the control information is transmitted in carrier2).

Figure 20:
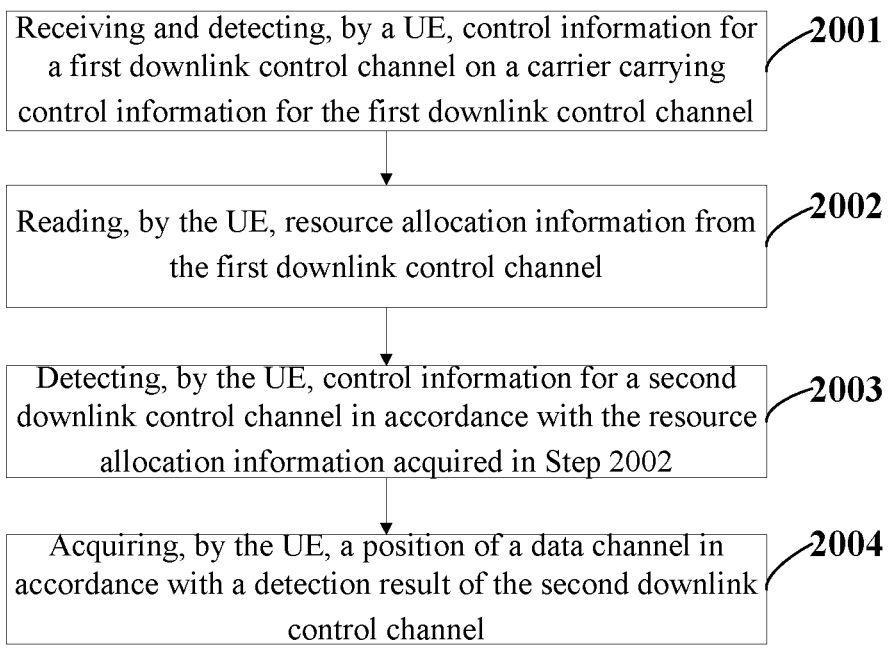
FIG. 20 is a flow chart of a downlink control channel detection procedure performed by the UE according to one embodiment of the present disclosure.

As shown in FIG. 20, the step of detecting, by the UE, the control signaling through two detection operations so as to detect the control information related to the UE may include the following steps.

Step 2001: receiving and detecting, by the UE, the control information for the first downlink control channel on a carrier carrying the control information for the first downlink control channel. To be specific, the UE may detect the control information in a blind detection manner or in accordance with a priori physical layer or high-layer signaling configuration.

Step 2002: reading, by the UE, resource allocation information from the first downlink control channel, e.g., a position where the second downlink control channel occurs in a time domain, a position where the second downlink control channel occurs in a frequency domain, beam information or carrier number.

Step 2003: detecting, by the UE, the control information for the second downlink control channel in accordance with the resource allocation information acquired in Step 2002, and possible together with any other effective information.

Step 2004: acquiring, by the UE, the position of the data channel in accordance with a detection result of the second downlink control channel, e.g., a time-domain position, a frequency-domain position, an MCS or an HARQ process. In this way, the UE may acquire the downlink control channel corresponding to the physical layer indication information in a blind detection manner or in accordance with the priori physical layer or the high-layer control signaling, detect the downlink control channel to acquire the physical layer indication information, and detect the second downlink control channel corresponding to the resource position information in accordance with the physical layer indication information, so as to acquire the corresponding control information. As a result, it is able to reduce the quantity of the detection operations made by the UE, thereby to reduce the power consumption.

According to the embodiment of the present disclosure, the UE may detect the first downlink control channel to acquire the indication information from the network side device, parse the indication information to determine the resource position information about the second downlink control channel carrying the downlink control information, and then detect the downlink control information merely in the second downlink control channel indicated in the indication information. As a result, it is able to reduce the quantity of the detection operations made by the UE, thereby to reduce the power consumption. In addition, discontinuous transmission configuration signaling, which should have been performed at L2/L3, may be indicated by the physical layer indication information, so it is able to reduce the detection complexity at the UE.

It should be further appreciated that, such phrases as "one embodiment" and "one of the embodiments" intend to indicate that the features, structures or characteristics are contained in at least one embodiment of the present disclosure, rather than referring to a same embodiment. In addition, the features, structures or characteristics may be combined in any embodiment or embodiments in an appropriate manner.

It should be further appreciated that, serial numbers of the steps shall not be used to define the order of the steps, and instead, the order of the steps shall be determined in accordance with their functions and internal logics. In addition, the terms "system" and "network" may be replaced with each other. The expression "and/or" is merely used to describe the relationship between objects, and it includes three relationships. For example, "A and/or B" may represent that, there is only A, there are both A and B, and there is only B. Further, the symbol "/" usually refers to "or".

The UE in the embodiments of the present disclosure may be a mobile phone or any other device capable of transmitting or receiving a radio signal, including a terminal, a Personal Digital Assistant (PDA), a wireless modem, a wireless communication device, a handheld device, a laptop computer, a cordless telephone, a Wireless Local Loop (WLL) station, Customer Premise Equipment (CPE) or an Mifi capable of converting a mobile signal into a WiFi signal, an intelligent household electrical appliance, or any other device capable of spontaneously communicating with a mobile communication network.

In the embodiments of the present disclosure, the form of the base station will not be particularly defined, and it may be a macro base station, a pico base station, a Node B (i.e., a $3^{rd}$-Generation (3G) base station), an evolved NodeB (eNB), a femto eNB (or Home eNB (HeNB)), a relay, an access point, a Remote Radio Unit (RRU), or a Remote Radio Head (RRH).

In addition, along with the development of the $5^{th}$-Generation (5G) technology, the base station may also be any other functional node, e.g., a Central Unit (CU) or a Distributed Unit (DU). The scheme in the embodiments of the present disclosure may be applied to the above scenarios. In a 5G networking scenario, a network side node may include CUs and DUs, and a UE side node may include the UE. Each CU may control a plurality of DUs deployed in a certain area. These DUs may also be called as Transmission Reception Points (TRPs). Each TRP may communicate with the UE via an air interface. Each UE may be served by one or more TRPs simultaneously, so as to perform the data transmission. In the embodiments of the present disclosure, nodes for transmitting and receiving radio signaling and data at the network side, including eNB of an LTE system and CUs/DUs (TRPs) adopted in the 5G technology, may be collectively called as base station.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), an ROM, an RAM, a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A downlink control channel detection method performed by a User Equipment (UE), comprising:
    determining a detection mode for a downlink control channel; and
    detecting the downlink control channel in accordance with the determined detection mode for the downlink control channel,
    wherein the detection mode for the downlink control channel comprises a one-stage detection mode and a multiple-stage detection mode, in the one-stage detection mode control information for the detection of a data channel is acquired through a single downlink control channel detection operation, and in the multiple-stage detection mode the control information for the detection of the data channel is acquired through at least two downlink control channel detection operations;
    the UE is configured to read control information for the detection of a next-stage downlink control channel from the first downlink control channel, and detect the downlink control channels stage by stage in accordance with the control information for the detection of the downlink control channel until the control information for the detection of the data channel has been acquired by the UE, when the determined detection mode for the downlink control channel is the multiple-stage detection mode.

2. The downlink control channel detection method according to claim 1, wherein the determining the detection mode for the downlink control channel comprises:
    detecting a first downlink control channel to acquire control signaling hierarchical information; and
    determining the detection mode for the downlink control channel in accordance with the control signaling hierarchical information,
    wherein the control signaling hierarchical information is used for indicating the detection mode for the downlink control channel.

3. The downlink control channel detection method according to claim 2, wherein the detecting the first downlink control channel comprises:
    detecting the first downlink control channel in a blind detection manner, and reading the control signaling hierarchical information from the first downlink control channel; or
    determining a resource position of the first downlink control channel in accordance with physical layer signaling or high-layer control signaling acquired in advance, detecting the first downlink control channel, and reading the control signaling hierarchical information from the first downlink control channel.

4. The downlink control channel detection method according to claim 2, wherein the detecting the downlink control channel in accordance with the determined detection mode for the downlink control channel comprises:
    when the determined detection mode for the downlink control channel is the one-stage detection mode, reading the control information for the detection of the data channel from the first downlink control channel.

5. The downlink control channel detection method according to claim 1, wherein the determining the detection mode for the downlink control channel comprises:
    determining the detection mode for the downlink control channel in accordance with high-layer control signaling acquired in advance, wherein the high-layer control signaling comprises Radio Resource Control (RRC) signaling or a Media Access Control (MAC) message.

6. The downlink control channel detection method according to claim 5, wherein the detecting the downlink control channel in accordance with the determined detection mode for the downlink control channel comprises:
    when the determined detection mode for the downlink control channel is the one-stage detection mode, detecting the first downlink control channel in a blind detection manner or in accordance with the physical layer signaling or high-layer control signaling acquired in advance; and
    reading the control information for the detection of the data channel from the detected first downlink control channel,
    wherein the detecting the downlink control channel in accordance with the determined detection mode for the downlink control channel comprises:
    when the determined detection mode for the downlink control channel is the multiple-stage detection mode, detecting the first downlink control channel in a blind detection manner or in accordance with the physical layer signaling or high-layer control signaling acquired in advance;

reading the control information for the detection of a next-stage downlink control channel from the first downlink control channel; and detecting the downlink control channels stage by stage in accordance with the control information for the detection of the downlink control channel, until the control information for the detection of the data channel has been acquired.

7. The downlink control channel detection method according to claim 1, wherein the control information for the detection of the downlink control channel comprises at least one of a time-domain position of the downlink control channel, a frequency-domain position of the downlink control channel, a space-domain position of the downlink control channel, and indices of subcarriers where the downlink control channel is located.

8. The downlink control channel detection method according to claim 1, wherein the control information for the detection of the data channel comprises at least one of a resource position of the data channel, a modulation and coding scheme adopted by the data channel, and a Hybrid Automatic Repeat reQuest (HARQ) process corresponding to the data channel.

9. A network side device, comprising a processor, a memory and a computer program stored in the memory and executed by the processor, wherein the processor is configured to execute the computer program to implement a downlink control channel detection method, comprising:

selecting a transmission mode for a downlink control channel; and transmitting the downlink control channel in accordance with the selected transmission mode for the downlink control channel, wherein the transmission mode for the downlink control channel comprises a one-stage transmission mode and a multiple-stage transmission mode, in the one-stage transmission mode control information for the detection of a data channel is provided through the transmission of the downlink control channel for one time, and in the multiple-stage transmission mode the control information for the detection of the data channel is provided through the transmission of the downlink control channel for several times;

the network side device is configured to transmit the control information for the detection of a next-stage downlink control channel on a current-stage downlink control channel other than a last-stage downlink control channel, and transmit the control information for the detection of the data channel on the last-stage downlink control channel, when the selected transmission mode for the downlink control channel is the multiple-stage transmission mode.

10. The network side device according to claim 9, wherein the transmitting the downlink control channel in accordance with the selected transmission mode for the downlink control channel comprises:

when the selected transmission mode for the downlink control channel is the one-stage transmission mode, transmitting the control information and signaling hierarchical information, wherein the signaling hierarchical information is configured for indicating the one-stage transmission mode and the control information is configured for the detection of the data channel on a first downlink control channel.

11. The network side device according to claim 10, wherein the transmitting the downlink control channel in accordance with the selected transmission mode for the downlink control channel comprises:

when the selected transmission mode for the downlink control channel is the multiple-stage transmission mode, transmitting the signaling hierarchical information for indicating the multiple-stage transmission mode on the first downlink control channel; and transmitting control information for the detection of a next-stage downlink control channel on a current-stage downlink control channel other than a last-stage downlink control channel, and transmitting the control information for the detection of the data channel on the last-stage downlink control channel.

12. The network side device according to claim 11, wherein the control information for the detection of the downlink control channel comprises at least one of a time-domain position of the downlink control channel, a frequency-domain position of the downlink control channel, a space-domain position of the downlink control channel, and indices of subcarriers where the downlink control channel is located; and wherein the control information for the detection of the data channel comprises at least one of a resource position of the data channel, a modulation and coding scheme adopted by the data channel, and a Hybrid Automatic Repeat Request (HARQ) process information corresponding to the data channel.

13. The network side device according to claim 10, wherein the processor is further configured to execute the computer program to implement a step of: prior to transmitting the downlink control channel, transmitting physical layer signaling or high-layer control signaling for indicating a resource position of the first downlink control channel to a User Equipment (UE).

14. The network side device according to claim 9, the processor is further configured to execute the computer program to implement a step of:

when the selected transmission mode for the downlink control channel is the multiple-stage transmission mode, performing a zero-padding operation or a compression operation on each control message transmitted on the downlink control channel, wherein the control messages acquired after the zero-padding operation or compression operation have a same length.

15. The network side device according to claim 14, wherein the performing the zero-padding operation on each control message transmitted on the downlink control channel comprises:

determining a maximum length of the control message transmitted on each downlink control channel, and performing the zero-padding operation on each control message having a length smaller than the maximum length, to acquire the control message after the zero-padding operation, wherein the performing the compression operation on each control message transmitted on the downlink control channel comprises:

determining a final length of the control message transmitted on each downlink control channel, discarding a predetermined field in each control message having a length greater than the final length to acquire the control message after the compression operation, and transmitting the discarded predetermined field to the UE through high-layer control signaling.

16. The network side device according to claim 9, wherein the transmitting the downlink control channel in accordance with the selected transmission mode for the downlink control channel comprises:

when the selected transmission mode for the downlink control channel is the one-stage transmission mode, transmitting the control information for the detection of the data channel on the first downlink control channel.

17. The network side device according to claim 16, wherein the processor is further configured to execute the computer program to implement a step of: prior to transmitting the downlink control channel,
transmitting physical layer signaling or high-layer control signaling for indicating the detection mode for the downlink control channel to the UE, wherein the detection modes for the downlink control channel correspond to the transmission modes for the downlink control channel respectively.

18. A User Equipment (UE), comprising a processor, a memory and a computer program stored in the memory and executed by the processor, wherein the processor is configured to execute the computer program to implement a downlink control channel detection method, comprising:
determining a detection mode for a downlink control channel; and
detecting the downlink control channel in accordance with the determined detection mode for the downlink control channel,
wherein the detection mode for the downlink control channel comprises a one-stage detection mode and a multiple-stage detection mode, in the one-stage detection mode control information for the detection of a data channel is acquired through a single downlink control channel detection operation, and in the multiple-stage detection mode the control information for the detection of the data channel is acquired through at least two downlink control channel detection operations;
the UE is configured to read control information for the detection of a next-stage downlink control channel from the first downlink control channel, and detect the downlink control channels stage by stage in accordance with the control information for the detection of the downlink control channel until the control information for the detection of the data channel has been acquired by the UE, when the determined detection mode for the downlink control channel is the multiple-stage detection mode.

19. The UE according to claim 18, wherein the determining the detection mode for the downlink control channel comprises:
detecting a first downlink control channel to acquire control signaling hierarchical information; and
determining the detection mode for the downlink control channel in accordance with the control signaling hierarchical information,
wherein the control signaling hierarchical information is used for indicating the detection mode for the downlink control channel.

20. The UE according to claim 19, wherein the detecting the first downlink control channel comprises:
detecting the first downlink control channel in a blind detection manner, and reading the control signaling hierarchical information from the first downlink control channel; or
determining a resource position of the first downlink control channel in accordance with physical layer signaling or high-layer control signaling acquired in advance, detecting the first downlink control channel, and reading the control signaling hierarchical information from the first downlink control channel.

* * * * *